US012217734B2

(12) United States Patent
Xiao et al.

(10) Patent No.: US 12,217,734 B2
(45) **Date of Patent: *Feb. 4, 2025**

(54) ACOUSTIC DEVICES

(71) Applicant: SHENZHEN SHOKZ CO., LTD., Guangdong (CN)

(72) Inventors: Le Xiao, Shenzhen (CN); Jinbo Zheng, Shenzhen (CN); Chengqian Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,746

(22) Filed: Jun. 11, 2023

(65) Prior Publication Data

US 2023/0317048 A1 Oct. 5, 2023

Related U.S. Application Data

(63) Continuation of application No. 17/657,743, filed on Apr. 1, 2022, now Pat. No. 11,715,451, which is a (Continued)

(51) Int. Cl.

*G10K 11/178* (2006.01)
*H04R 1/10* (2006.01)

(Continued)

(52) U.S. Cl.

CPC .. *G10K 11/17823* (2018.01); *G10K 11/17873* (2018.01); *H04R 1/1008* (2013.01);

(Continued)

(58) Field of Classification Search

CPC ...... H04R 1/1008; H04R 1/406; H04R 3/005; H04R 2460/13; G10K 11/17823;

(Continued)

(56) References Cited

U.S. PATENT DOCUMENTS 8,472,636 B2 * 6/2013 Sibbald ............ G10K 11/17861 381/71.7
10,219,083 B2 2/2019 Farmani et al.

(Continued)

FOREIGN PATENT DOCUMENTS

CN 107346664 A 11/2017
CN 107452375 A 12/2017

(Continued)

OTHER PUBLICATIONS

International Search Report in PCT/CN2021/091652 mailed on Jun. 29, 2021, 6 pages.

(Continued)

*Primary Examiner* — William A Jerez Lora
(74) *Attorney, Agent, or Firm* — METIS IP LLC

(57) ABSTRACT

The present disclosure provides an acoustic device including a microphone array, a processor, and at least one speaker. The microphone array may be configured to acquire an environmental noise. The processor may be configured to estimate a sound field at a target spatial position using the microphone array. The target spatial position may be closer to an ear canal of a user than each microphone in the microphone array. The processor may be configured to generate a noise reduction signal based on the environmental noise and the sound field estimation of the target spatial position. The at least one speaker may be configured to output a target signal based on the noise reduction signal. The target signal may be used to reduce the environmental noise. The microphone array may be arranged in a target area to minimize an interference signal from the at least one speaker to the microphone array.

20 Claims, 16 Drawing Sheets

Related U.S. Application Data continuation of application No. 17/451,659, filed on Oct. 21, 2021, now Pat. No. 11,328,702, which is a continuation of application No. PCT/CN2021/091652, filed on Apr. 30, 2021.

(51) Int. Cl.
*H04R 1/40* (2006.01)
*H04R 3/00* (2006.01)

(52) U.S. Cl.
CPC ........... *H04R 1/105* (2013.01); *H04R 1/1066* (2013.01); *H04R 1/406* (2013.01); *H04R 3/005* (2013.01); *G10K 2210/1081* (2013.01); *G10K 2210/3023* (2013.01); *G10K 2210/3056* (2013.01); *H04R 2460/09* (2013.01); *H04R 2460/11* (2013.01); *H04R 2460/13* (2013.01)

(58) Field of Classification Search
CPC ..... G10K 11/17873; G10K 2210/1081; G10K 2210/3023; G10K 2210/3056
USPC ........................... 381/56, 58, 71.1, 71.6, 122
See application file for complete search history.

(56) References Cited

U.S. PATENT DOCUMENTS

| | | | | |
|---|---|---|---|---|
| 10,631,078 | B2 | 4/2020 | He | |
| 2005/0117771 | A1 | 6/2005 | Vosburgh et al. | |
| 2012/0057718 | A1 | 3/2012 | Vernon | |
| 2013/0142349 | A1* | 6/2013 | Liu | G10L 21/0208 381/71.11 |
| 2013/0259243 | A1* | 10/2013 | Herre | G10L 19/02 381/57 |
| 2014/0141724 | A1 | 5/2014 | Liu et al. | |
| 2014/0185845 | A1 | 7/2014 | Udesen | |
| 2019/0304431 | A1 | 10/2019 | Cardinaux et al. | |
| 2020/0027437 | A1 | 1/2020 | Park et al. | |
| 2020/0202839 | A1 | 6/2020 | Asada et al. | |
| 2020/0302946 | A1 | 9/2020 | Jhawar et al. | |
| 2021/0044882 | A1* | 2/2021 | Jain | G10K 11/178 |
| 2021/0161498 | A1 | 6/2021 | Hu | |

FOREIGN PATENT DOCUMENTS

| | | | |
|---|---|---|---|
| CN | 108668188 | A | 10/2018 |
| CN | 111935589 | A | 11/2020 |
| TW | 201228415 | A | 7/2012 |

OTHER PUBLICATIONS

International Search Report in PCT/CN2021/089670 mailed on Aug. 16, 2021, 6 pages.

Written Opinion in PCT/CN2021/091652 mailed on Jun. 29, 2021, 6 pages.

Written Opinion in PCT/CN2021/089670 mailed on Aug. 16, 2021, 6 pages.

* cited by examiner

FIG. 5A
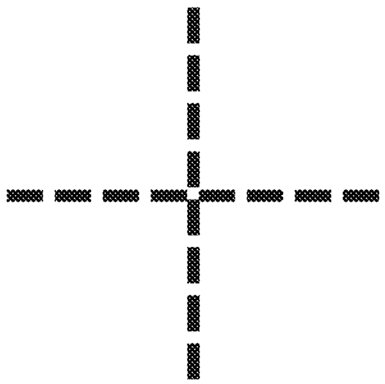
FIG. 5B
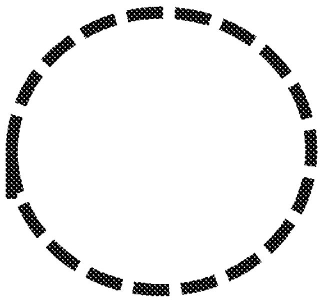
FIG. 5C
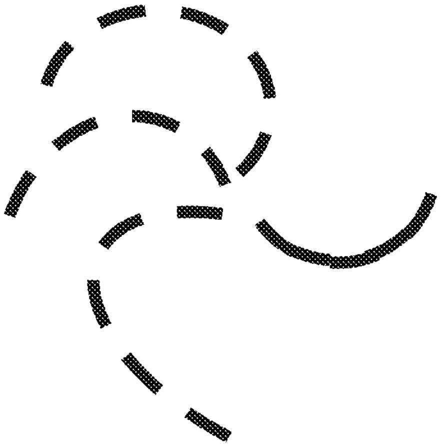
FIG. 5D

ACOUSTIC DEVICES

CROSS-REFERENCE TO RELATED APPLICATIONS

This application is a Continuation of U.S. application Ser. No. 17/657,743, filed on Apr. 1, 2022, which is a Continuation of U.S. application Ser. No. 17/451,659 (issued as U.S. Pat. No. 11,328,702), filed on Oct. 21, 2021, which is a Continuation of International Patent Application No. PCT/CN2021/091652, filed on Apr. 30, 2021, which claims priority of International Patent Application No. PCT/CN2021/089670, filed on Apr. 25, 2021, the entire contents of each of which are incorporated herein by reference.

TECHNICAL FIELD

The present disclosure generally relates to the field of acoustics, in particular, to an acoustic device.

BACKGROUND

Acoustic devices allow users to listen to audio content and make voice calls while ensuring the privacy of user interaction content without disturbing the surrounding people. Acoustic devices may generally include two types of in-ear acoustic devices and open acoustic devices. The in-ear acoustic devices may block the user's ears during use and give the user feelings of blockage, foreign body, or swelling and pain when worn for a long time. The open acoustic devices may open the user's ears, which is conducive to long-term wear. But when the external noise is large, the noise reduction effect of an open acoustic device is not obvious, thereby reducing the user's hearing experience.

Therefore, it is desirable to provide an acoustic device that may open the user's ears and improve the user's hearing experience.

SUMMARY

According to an aspect of the present disclosure, an acoustic device is provided. The acoustic device may include a microphone array, a processor, and at least one speaker. The microphone array may be configured to acquire an environmental noise. The processor may be configured to estimate a sound field at a target spatial position using the microphone array. The target spatial position may be closer to an ear canal of a user than each microphone in the microphone array. The processor may further be configured to generate a noise reduction signal based on the environmental noise and the sound field estimation of the target spatial position. The at least one speaker may be configured to output a target signal based on the noise reduction signal. The target signal may be used to reduce the environmental noise. The microphone array may be arranged in a target area to minimize an interference signal from the at least one speaker to the microphone array.

In some embodiments, to generate the noise reduction signal based on the environmental noise and the sound field estimation of the target spatial position, the processor may further be configured to estimate a noise at the target spatial position based on the environmental noise and generate the noise reduction signal based on the noise at the target spatial position and the sound field estimation of the target spatial position.

In some embodiments, the acoustic device may further include one or more sensors configured to acquire motion information of the acoustic device. The processor may further be configured to update the noise at the target spatial position and the sound field estimation of the target spatial position based on the motion information and generate the noise reduction signal based on the updated noise at the target spatial position and the updated sound field estimation of the target spatial position.

In some embodiments, wherein to estimate the noise at the target spatial position based on the environmental noise, the processor may further be configured to determine one or more spatial noise sources related to the environmental noise and estimate the noise at the target spatial position based on the spatial noise sources.

In some embodiments, to estimate the sound field at the target spatial position using the microphone array, the processor may further be configured to construct a virtual microphone based on the microphone array. The virtual microphone may include a mathematical model or a machine learning model that indicates audio data collected by a microphone if the target spatial position includes a microphone. The processor may further be configured to estimate the sound field at the target spatial position based on the virtual microphone.

In some embodiments, to generate the noise reduction signal based on the environmental noise and the sound field estimation of the target spatial position, the processor may further be configured to estimate the noise at the target spatial position based on the virtual microphone and generate the noise reduction signal based on the noise at the target spatial position and the sound field estimation of the target spatial position.

In some embodiments, the at least one speaker may be a bone conduction speaker. The interference signal may include a leakage signal and a vibration signal of the bone conduction speaker. A total energy of the leakage signal and the vibration signal transmitted from the target area to the bone conduction speaker of the microphone array may be minimal.

In some embodiments, a position of the target area may be related to a facing direction of a diaphragm of at least one microphone in the microphone array. The facing direction of the diaphragm of the at least one microphone may reduce a magnitude of the vibration signal of the bone conduction speaker received by the at least one microphone. The facing direction of the diaphragm of the at least one microphone may make the vibration signal of the bone conduction speaker received by the at least one microphone and the leakage signal of the bone conduction speaker received by the at least one microphone at least partially offset each other. The vibration signal of the bone conduction speaker received by the at least one microphone may reduce the leakage signal of the bone conduction speaker received by the at least one microphone by 5-6 dB.

In some embodiments, the at least one speaker may be an air conduction speaker. A sound pressure level of a radiated sound field of the air conduction speaker at the target area may be minimal.

In some embodiments, the processor may further be configured to process the noise reduction signal based on a transfer function. The transfer function may include a first transfer function and a second transfer function. The first transfer function may indicate a change in a parameter of the target signal from the at least one speaker to a position where the target signal and the environmental noise offset. The second transfer function may indicate a change in a parameter of the environmental noise from the target spatial position to the position where the target signal and the environmental noise offset. The at least one speaker may further be configured to output the target signal based on the processed noise reduction signal.

In some embodiments, to generate the noise reduction signal based on the environmental noise and the sound field estimation of the target spatial position, the processor may further be configured to divide the environmental noise into a plurality of frequency bands. The plurality of frequency bands may correspond to different frequency ranges. For at least one of the plurality of frequency bands, the processor may generate the noise reduction signal corresponding to each of the at least one frequency band.

In some embodiments, the processor may further be configured to generate the noise reduction signal by performing amplitude and phase adjustments on the noise at the target spatial position based on the sound field estimation of the target spatial position.

In some embodiments, the acoustic device may further include a fixing structure configured to fix the acoustic device to a position near an ear of the user without blocking the ear canal of the user.

In some embodiments, the acoustic device may further include a housing structure configured to carry or accommodate the microphone array, the processor, and the at least one speaker.

According to another aspect of the present disclosure, a noise reduction method is provided. The method may include acquiring an environmental noise using a microphone array. The method may include estimating a sound field at a target spatial position using the microphone array using a processor. The target spatial position may be closer to an ear canal of a user than each microphone in the microphone array. The method may include generating a noise reduction signal based on the environmental noise and the sound field estimation of the target spatial position using the processor. The method may further include outputting a target signal based on the noise reduction signal using at least one speaker. The target signal may be used to reduce the environmental noise. The microphone array may be arranged in a target area to minimize an interference signal from the at least one speaker to the microphone array.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 5A-5D are schematic diagrams illustrating exemplary arrangements of microphone arrays according to some embodiments of the present disclosure;

DETAILED DESCRIPTION

Figure 1:
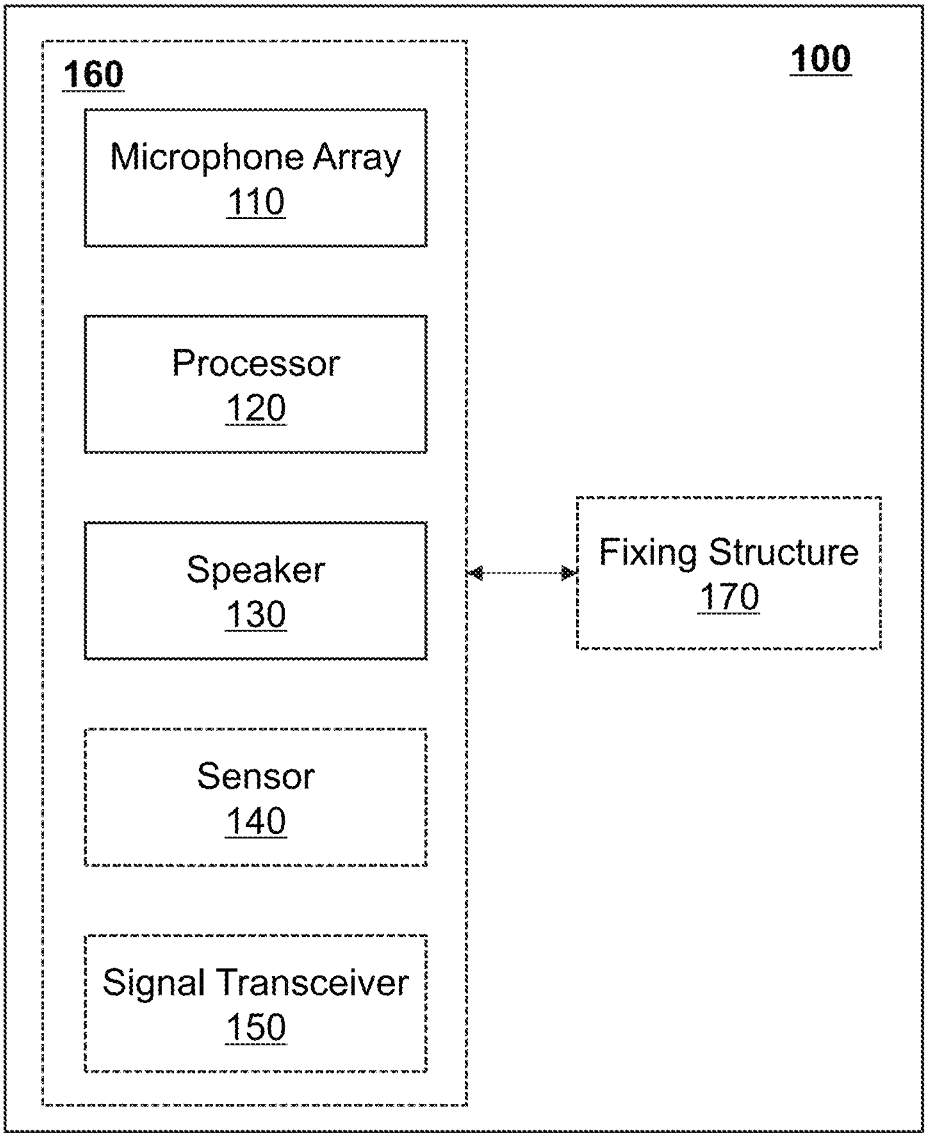
FIG. 1 is a schematic diagram illustrating an exemplary acoustic device according to some embodiments of the present disclosure.

In order to illustrate the technical solutions related to the embodiments of the present disclosure, a brief introduction of the drawings referred to in the description of the embodiments is provided below. Obviously, the drawings described below are only some examples or embodiments of the present disclosure. Those skilled in the art, without further creative efforts, may apply the present disclosure to other similar scenarios according to these drawings. Unless apparent from the locale or otherwise stated, like reference numerals represent similar structures or operations throughout the several views of the drawings.

It will be understood that the term "system," "device," "unit," and/or "module" used herein are one method to distinguish different components, elements, parts, sections, or assembly of different levels in ascending order. However, the terms may be displaced by another expression if they achieve the same purpose.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

An open acoustic device (e.g., an open acoustic headset) may keep the user's ears open. The open acoustic device may fix a speaker to a position near the user's ear without blocking the user's ear canal through a fixing structure (e.g., an ear hook, a head hook, a temple, etc.). When the user uses the open acoustic device, the external environmental noise may be heard by the user, which makes the user's hearing experience poor. For example, in a place (e.g., a street, a scenic spot, etc.) where the external environment is noisy when a user uses an open acoustic device to play music, the external environmental noise may directly enter the user's ear canal and make the user hear large environmental noise. The environmental noise may interfere with the user's music listening experience. As another example, when a user wears an open acoustic device for a call, a microphone of the open acoustic device not only picks up the user's speaking voice but also picks up environmental noise, which makes the user's call experience poor.

To solve the above problem, the present disclosure provides an acoustic device. The acoustic device may include a microphone array, a processor, and at least one speaker. The microphone array may be configured to acquire environmental noise. The processor may be configured to estimate a sound field at a target spatial position using the microphone array. The target spatial position may be closer to an ear canal of a user than any microphone in the microphone array. It should be understood that microphones in the microphone array may be distributed at different positions near the user's ear canal, and the microphones in the microphone array may be used to estimate the sound field at a position (e.g., the target spatial position) close to the user's ear canal. The processor may be further configured to generate a noise reduction signal based on the acquired environmental noise and the sound field estimation of the target spatial position. The at least one speaker may be configured to output a target signal based on the noise reduction signal. The target signal may be used to reduce the environmental noise. In addition, the microphone array may be arranged in a target area so that an interference signal from the at least one speaker to the microphone array is minimal (i.e., minimize the interference signal from the at least one speaker to the microphone array). As used herein, the "minimal" refers to that the microphone array placed in the target area is less affected by the interference signal than placed in other areas. When the at least one speaker is a bone conduction speaker, the interference signal may include a leakage signal and a vibration signal of the bone conduction speaker, and the target area may be an area where a total energy of the leakage signal and the vibration signal transmitted to the bone conduction speaker of the microphone array is minimal. When the at least one speaker is an air conduction speaker, the target area may be an area where a sound pressure level of a radiated sound field of the air conduction speaker is minimal.

In some embodiments of the present disclosure, according to the above-mentioned setting, the target signal output by at least one speaker may reduce the environmental noise at the user's ear canal (e.g., the target spatial position), which realizes the active noise reduction of the acoustic device, thereby improving the user's hearing experience during the use of the acoustic device.

In some embodiments of the present disclosure, the microphone array (also referred to as feed-forward microphones) may simultaneously realize picking up environmental noise and estimating the sound field at the user's ear canal (e.g., the target spatial position).

In some embodiments of the present disclosure, the microphone array may be arranged in the target area, which may reduce or prevent the microphone array from picking up the interference signal (e.g., the target signal) emitted by at least one speaker, thereby realizing the active noise reduction of the open acoustic device.

FIG. 1 is a schematic diagram illustrating an exemplary acoustic device according to some embodiments of the present disclosure. In some embodiments, the acoustic device 100 may be an open acoustic device. As shown in FIG. 1, the acoustic device 100 may include a microphone array 110, a processor 120, and a speaker 130. In some embodiments, the microphone array 110 may acquire environmental noise, convert the acquired environmental noise into an electrical signal, and transmit the electrical signal to the processor 120 for processing. The processor 120 may be coupled (e.g., electrically connected) to the microphone array 110 and the speaker 130. The processor 120 may receive the electrical signal transmitted by the microphone array 110, process the electrical signal to generate a noise reduction signal, and transmit the generated noise reduction signal to the speaker 130. The speaker 130 may output a target signal based on the noise reduction signal. The target signal may be used to reduce or offset the environmental noise at the user's ear canal (e.g., a target spatial position), thereby realizing active noise reduction of the acoustic device 100 and improving the user's hearing experience during the use of the acoustic device 100.

The microphone array 110 may be configured to acquire the environmental noise. In some embodiments, the environmental noise may refer to a combination of multiple external sounds in the environment where the user is located. In some embodiments, the external sounds may be sounds that the user does not want to hear and will affect the sound that the user wants to hear. Merely by way of example, the environmental noise may include traffic noise, industrial noise, construction noise, social noise, or the like, or any combination thereof. The traffic noise may include, but is not limited to, driving noise, whistle noise, etc., of a motor vehicle. The industrial noise may include, but is not limited to, operating noise of power machinery in a factory. The construction noise may include but is not limited to, excavation noise, hole drilling noise, a mixing noise, etc., of power machinery. The social noise may include, but is not limited to, mass gathering noise, cultural and entertainment propaganda noise, crowd noise, household appliances noise, or the like. In some embodiments, the microphone array 110 may be disposed near the ear canal of the user to acquire environmental noise transmitted to the ear canal of the user, convert the acquired environmental noise into an electrical signal, and transmit the electrical signal to the processor 120 for processing. In some embodiments, the microphone array 110 may be disposed at the left ear and/or the right ear of the user. For example, the microphone array 110 may include a first sub-microphone array and a second sub-microphone array. The first sub-microphone array may be located at the user's left ear and the second sub-microphone array may be located at the user's right ear. The first sub-microphone array and the second sub-microphone array may enter a working state at the same time or one of the two sub-microphone arrays may enter the working state.

In some embodiments, the environmental noise may include the sound of a user's speech. For example, the microphone array 110 may acquire the environmental noise based on the state of the acoustic device 100. When the acoustic device 100 is not in a conversation, the sound generated by the user's speech may be regarded as environmental noise, and the microphone array 110 may acquire the sound of the user's speech and other environmental noises at the same time. When the acoustic device 100 is in a conversation, the sound generated by the user's speech may not be regarded as environmental noise, and the microphone array 110 may acquire the environmental noise in addition to the sound of the user's speech. For example, the microphone array 110 may acquire noise emitted by a noise source that is away from the microphone array 110 by a certain distance (e.g., 0.5 meters, 1 meter).

In some embodiments, the microphone array 110 may include one or more air conduction microphones. For example, when the user uses the acoustic device 100 to listen to music, the air conduction microphone may simultaneously acquire the external environmental noise and the user's voice when the user speaks, and regard the acquired external environmental noise and the user's voice as the environmental noise together. In some embodiments, the microphone array 110 may include one or more bone conduction microphones. The bone conduction microphone may directly contact the user's skin. A vibration signal generated by the bones or muscles when the user speaks may be directly transmitted to the bone conduction microphone. The bone conduction microphone may convert the vibration signal into an electrical signal and transmit the electrical signal to the processor 120 for processing. The bone conduction microphone may not directly contact the human body. The vibration signal generated by the bones or muscles when the user speaks may be transmitted to a housing structure of the acoustic device 100, and then transmitted to the bone conduction microphone through the housing structure. In some embodiments, when the user is in a conversation, the processor 120 may use the sound signal collected by the air conduction microphone as environmental noise and use the environmental noise to perform noise reduction. In this case, the sound signal collected by the bone conduction microphone may be transmitted to a terminal device as a voice signal, so as to ensure the voice quality of the conversation.

In some embodiments, the processor 120 may control an on-off state of the bone conduction microphone and the air conduction microphone based on a working state of the acoustic device 100. The working state of the acoustic device 100 may refer to a usage state when the user wears the acoustic device 100. For example, the working state of the acoustic device 100 may include, but is not limited to, a call state, a non-call state (e.g., a music playing state), a voice message sending state, or the like. In some embodiments, when the microphone array 110 picks up environmental noise, the on-off state of the bone conduction microphone and/or the air conduction microphone in the microphone array 110 may be determined based on the working state of the acoustic device 100. For example, when the user wears the acoustic device 100 to play music, the on-off state of the bone conduction microphone may be an off-state (also referred to as a standby state), and the on-off state of the air conduction microphone may be an on-state. As another example, when the user wears the acoustic device 100 to send a voice message, the on-off state of the bone conduction microphone may be the on-state, and the on-off state of the air conduction microphone may be the on-state. In some embodiments, the processor 120 may control the on-off state of the microphone (e.g., the bone conduction microphone, the air conduction microphone) in the microphone array 110 by sending a control signal.

In some embodiments, when the working state of the acoustic device 100 is in the non-call state (e.g., the music playing state), the processor 120 may control the bone conduction microphone to be in the off-state and the air conduction microphone to be in the on-state. When the acoustic device 100 is in the non-call state, the voice signal of the user's own speech may be regarded as environmental noise. In this case, the voice signal of the user's speech included in the environmental noise that is acquired by the air conduction microphone may not be filtered, so that the voice signal of the user's speech as part of the environmental noise may be offset with the target signal output by the speaker 130. When the working state of the acoustic device 100 is in the call state, the processor 120 may control the bone conduction microphone to be in the on-state and the air conduction microphone to be in the on-state. When the acoustic device 100 is in the call state, the voice signal of the user's own speech needs to be retained. In this case, the processor 120 may send a control signal to control the bone conduction microphone to be on. The bone conduction microphone may acquire the voice signal of the user's speech. The processor 120 may remove the voice signal of the user's speech acquired by the bone conduction microphone from the environmental noise acquired by the air conduction microphone, so that the voice signal of the user's speech does not offset the target signal output by the speaker 130, thereby ensuring the user's normal conversation.

In some embodiments, when the working state of the acoustic device 100 is in the call state, if a sound pressure of the environmental noise is greater than a preset threshold, the processor 120 may control the bone conduction microphone to maintain the on-state. The sound pressure of the environmental noise may reflect an intensity of environmental noise. As used herein, the preset threshold may be a value (e.g., 50 dB, 60 dB, 70 dB, or any other value) pre-stored in the acoustic device 100. When the sound pressure of the environmental noise is greater than the preset threshold, the environmental noise may affect the conversation quality of the user. The processor 120 may control the bone conduction microphone to maintain the on-state by sending a control signal. The bone conduction microphone may obtain a vibration signal of facial muscles when the user speaks and basically not acquire external environmental noise. In such case, the vibration signal obtained by the bone conduction microphone may be used as the voice signal during the user's conversation, thereby ensuring the user's normal conversation.

In some embodiments, when the working state of the acoustic device 100 is in the call state, if the sound pressure of the environmental noise is less than the preset threshold, the processor 120 may control the bone conduction microphone to switch from the on-state to the off-state. When the sound pressure of the environmental noise is less than the preset threshold, the sound pressure of the environmental noise is smaller than the sound pressure of the voice signal of the user's speech. After the voice signal of the user's speech transmitted to a certain position of the user's ear through a first sound path is partially offset by the target signal output by the speaker 130 transmitted to the certain position of the user's ear through a second sound path, the remaining voice signal of the user's speech received by the user's auditory center may be enough to ensure the user's normal conversation. In this case, the processor 120 may control the bone conduction microphone to switch from the on-state to the off-state by sending a control signal, thereby reducing the signal processing complexity and the power consumption of the acoustic device 100.

In some embodiments, according to a working principle of a microphone, the microphone array 110 may include a moving-coil microphone, a ribbon microphone, a condenser microphone, an electret microphone, an electromagnetic microphone, a carbon particle microphone, or the like, or any combination thereof. In some embodiments, an arrangement of microphones in the microphone array 110 may include a linear array (e.g., a straight line, a curved line), a planar array (e.g., a regular and/or an irregular shape such as a cross, a circle, a ring, a polygon, a mesh, etc.), a three-dimensional array (e.g., a cylinder, a sphere, a hemisphere, a polyhedron, etc.), or the like, or any combination thereof. More descriptions regarding the arrangement of the microphones in the microphone array 110 may be found elsewhere in the present disclosure. See, e.g., FIGS. 5A-5D, FIGS. 6A-6B, and the relevant descriptions thereof.

The processor 120 may be configured to estimate a sound field at a target spatial position using the microphone array 110. The sound field at the target spatial position may refer to distribution and changes (e.g., changes with time, changes with position) of sound waves at or near the target spatial position. In some embodiments, the sound waves may include sound signals at or near the target spatial position. As used herein, "near" the target spatial position refers to that a distance between the sound signal and the target spatial position is less than a threshold, such as, 0.5 centimeters, 1 centimeter, 2 centimeters, etc. Physical quantities describing the sound field may include a sound pressure, a sound frequency, a sound amplitude, a sound phase, a sound source vibration speed, a density of a transfer medium (e.g., air), etc. Generally, the physical quantities may be functions of position and time. The target spatial position may refer to a spatial location close to an ear canal of the user by a specific distance. The target spatial position may be closer to the ear canal of the user than any microphone in the microphone array 110. As used herein, the specific distance may be, for example, 0.5 cm, 1 cm, 2 cm, 3 cm, or the like. In some embodiments, the target spatial position may be related to a count of the microphones in the microphone array 110 and/or positions of the microphones relative to the ear canal of the user. The target spatial position may be adjusted by adjusting the count of the microphones in the microphone array 110 and/or the positions of the microphones relative to the ear canal of the user. For example, by increasing the count of the microphones in the microphone array 110, the target spatial position may be closer to the ear canal of the user. As another example, by reducing distances between the microphones in the microphone array 110, the target spatial position may be closer to the ear canal of the user. As a further example, by changing the arrangement of the microphones in the microphone array 110, the target spatial position may be closer to the ear canal of the user.

The processor 120 may be further configured to generate a noise reduction signal based on the acquired environmental noise and the sound field estimation of the target spatial position. Specifically, the processor 120 may receive an electrical signal converted from the environmental noise transmitted by the microphone array 110 and process the electrical signal to obtain a parameter (e.g., an amplitude, a phase, etc.) of the environmental noise. Further, the processor 120 may adjust the parameter (e.g., the amplitude, the phase, etc.) of the environmental noise based on the sound field estimation of the target spatial position to generate a noise reduction signal. A parameter (e.g., the amplitude, the phase, etc.) of the noise reduction signal may correspond to the parameter of the environmental noise. For example, the amplitude of the noise reduction signal may be approximately equal to that of the environmental noise; the phase of the noise reduction signal may be approximately opposite to that of the environmental noise. In some embodiments, the processor 120 may include hardware modules and software modules. For example, the hardware module may include a digital signal processor (DSP) chip and an advanced RISC machine (ARM). The software module may include an algorithm module. More descriptions regarding the processor 120 may be found elsewhere in the present disclosure. See, e.g., FIG. 2 and the relevant descriptions thereof.

The speaker 130 may be configured to output a target signal based on the noise reduction signal. The target signal may be configured to reduce or eliminate environmental noise transmitted to a certain position of the user's ears (e.g., tympanic membrane, basement membrane). In some embodiments, when the user wears the acoustic device 100, the speaker 130 may be located near the user's ear. In some embodiments, according to the working principle of the speaker, the speaker 130 may include a dynamic speaker (e.g., a moving coil speaker), a magnetic speaker, an ion speaker, an electrostatic speaker (or a capacitive speaker), a piezoelectric speaker, or the like, or any combination thereof. In some embodiments, according to a propagation mode of sound output by the speaker, the speaker 130 may include an air conduction speaker and/or a bone conduction speaker. In some embodiments, a count of speakers 130 may be one or multiple. When the count of the speaker 130 is one, the speaker 130 may be configured to output the target signal to eliminate the environmental noise and deliver, to the user, sound information (e.g., device media audio, remote call audio) that the user needs to hear. For example, when the count of the speaker 130 is one air conduction speaker, the air conduction speaker may be configured to output the target signal to eliminate the environmental noise. In this case, the target signal may be a sound wave (i.e., the vibration of the air), which may be transmitted to the target spatial position through the air and offset with the environmental noise at the target spatial position. The air conduction speaker may also be configured to deliver the sound information that the user needs to hear. As another example, when the count of the speaker 130 is one bone conduction speaker, the bone conduction speaker may be configured to output the target signal to eliminate the environmental noise. In this case, the target signal may be a vibration signal (e.g., the vibration of a housing of the speaker), which may be transmitted to the user's basement membrane through bones or tissues and offset with the environmental noise at the user's basement membrane. The bone conduction speaker may also be configured to deliver the sound information that the user needs to hear. When the count of speakers 130 is multiple, a portion of the multiple speakers 130 may be configured to output the target signal to eliminate the environmental noise, and the other portion of the multiple speakers 130 may be configured to deliver, to the user, the sound information that the user needs to hear (e.g., the device media audio, the remote call audio). For example, when the count of speakers 130 is multiple and the speaker 130 includes at least one bone conduction speaker and at least one air conduction speaker, the at least one air conduction speaker may be configured to output sound waves to reduce or eliminate the environmental noise, and the at least one bone conduction speaker may be configured to deliver the sound information that the user needs to hear. Compared with the air conduction speaker, the bone conduction speaker may directly transmit a mechanical vibration to the user's auditory nerves through the user's body (e.g., bones, skin tissue, etc.), which has less interference for the air conduction microphone that picks up the environmental noise.

It should be noted that the speaker 130 may be an independent functional device or a part of a single device capable of implementing multiple functions. For example, the speaker 130 may be integrated with the processor 120 and/or formed as one body. In some embodiments, when the count of speakers 130 is multiple, the arrangement of the multiple speakers 130 may include a linear array (e.g., a straight line, a curved line), a planar array (e.g., a regular and/or an irregular shape such as a cross, a circle, a ring, a polygon, a mesh, etc.), a three-dimensional array (e.g., a cylinder, a sphere, a hemisphere, a polyhedron, etc.), or the like, or any combination thereof, which may be not limited in the present disclosure. In some embodiments, the speaker 130 may be disposed at a left ear and/or a right ear of the user. For example, the speaker 130 may include a first sub-speaker and a second sub-speaker. The first sub-speaker may be located at the user's left ear and the second sub-speaker may be located at the user's right ear. The first sub-speaker and the second sub-speaker may enter the working state at the same time or one of the two sub-speakers may enter the working state. In some embodiments, the speaker 130 may be a speaker with a directional sound field, a main lobe of which points toward the ear canal of the user.

In some embodiments, the acoustic device 100 may further include one or more sensors 140. The one or more sensors 140 may be electrically connected to other components (e.g., the processor 120) of the acoustic device 100. The one or more sensors 140 may be configured to obtain a physical location and/or motion information of the acoustic device 100. For example, the one or more sensors 140 may include an inertial measurement unit (IMU), a global positioning system (GPS), a radar, or the like. The motion information may include a motion trajectory, a motion direction, a motion speed, a motion acceleration, a motion angular velocity, motion-related time information (e.g., a start time of a motion, an end time of a motion), or the like, or any combination thereof. Taking the IMU as an example, the IMU may include a microelectronic mechanical system (MEMS). The microelectronic mechanical system may include a multi-axis accelerometer, a gyroscope, a magnetometer, or the like, or any combination thereof. The IMU may be configured to detect a physical location and/or motion information of the acoustic device 100 to enable the control of the acoustic device 100 based on the physical location and/or motion information. More descriptions regarding the control of the acoustic device 100 based on the physical position and/or motion information may be found elsewhere in the present disclosure. See, e.g., FIG. 4 and the relevant descriptions thereof.

In some embodiments, the acoustic device 100 may include a signal transceiver 150. The signal transceiver 150 may be electrically connected to other components (e.g., the processor 120) of the acoustic device 100. In some embodiments, the signal transceiver 150 may include Bluetooth, an antenna, or the like. The acoustic device 100 may communicate with other external devices (e.g., a mobile phone, a tablet computer, a smart watch) through the signal transceiver 150. For example, the acoustic device 100 may wirelessly communicate with other devices through Bluetooth.

In some embodiments, the acoustic device 100 may include a housing structure 160. The housing structure 160 may be configured to carry other components (e.g., the microphone array 110, the processor 120, the speaker 130, one or more sensors 140, and the signal transceiver 150) of the acoustic device 100. In some embodiments, the housing structure 160 may be a closed or semi-closed structure with a hollow interior. The other components of the acoustic device 100 may be located in or on the housing structure 160. In some embodiments, a shape of the housing structure 160 may be a regular or irregular three-dimensional structure such as a rectangular parallelepiped, a cylinder, a truncated cone, etc. When the user wears the acoustic device 100, the housing structure 160 may be located close to the user's ears. For example, the housing structure 160 may be located on a peripheral side (e.g., a front side or a back side) of the user's auricle. As another example, the housing structure 160 may be located on the user's ears without blocking or covering the user's ear canal. In some embodiments, the acoustic device 100 may be a bone conduction headset. At least one side of the housing structure 160 may be in contact with the user's skin. An acoustic driver (e.g., a vibrating speaker) in the bone conduction headset may convert an audio signal into a mechanical vibration, which may be transmitted to the user's auditory nerve through the housing structure 160 and the user's bones. In some embodiments, the acoustic device 100 may be an air conduction headset. At least one side of the housing structure 160 may be in contact with the user's skin or not. A side wall of the housing structure 160 may include at least one sound guiding hole. The speaker in the air conduction earphone may convert the audio signal into the air conduction sound, which may be radiated toward a direction of the user's ear through the sound guiding hole.

In some embodiments, the acoustic device 100 may include a fixing structure 170. The fixing structure 170 may be configured to fix the acoustic device 100 to a position near the user's ear without blocking the user's ear canal. In some embodiments, the fixing structure 170 may be physically connected to (e.g., through a snap connection, a screw connection, etc.) the housing structure 160 of the acoustic device 100. In some embodiments, the housing structure 160 of the acoustic device 100 may be a part of the fixing structure 170. In some embodiments, the fixing structure 170 may include an ear hook, a back hook, an elastic band, a temple, etc., so that the acoustic device 100 may be better fixed near the user's ears to prevent from falling during use. For example, the fixing structure 170 may be an ear hook configured to be worn around the ear. In some embodiments, the ear hook may be a continuous hook and elastically stretched to be worn on the user's ear. In this case, the ear hook may apply pressure to the user's auricle, so that the acoustic device 100 is firmly fixed on the user's ears or a specific position on the head. In some embodiments, the ear hook may be a discontinuous ribbon. For example, the ear hook may include a rigid part and a flexible part. The rigid part may be made of a rigid material (e.g., plastic or metal). The rigid part may be fixed to the housing structure 160 of the acoustic device 100 through a physical connection (e.g., a snap connection, a screw connection, etc.). The flexible part may be made of elastic material (e.g., cloth, composite material, or/and neoprene). As another example, the fixing structure 170 may be a neck strap configured to be worn around the neck/shoulder area. As another example, the fixing structure 170 may be a temple, which, as a part of glasses, is erected on the user's ear.

In some embodiments, the acoustic device 100 may include an interaction module (not shown) for adjusting the sound pressure of the target signal. In some embodiments, the interaction module may include a button, a voice assistant, a gesture sensor, or the like. The user may adjust a noise reduction mode of the acoustic device 100 by controlling the interaction module. Specifically, the user may adjust (e.g., zoom in or zoom out) the amplitude of the noise reduction signal by controlling the interaction module to change the sound pressure of the target signal emitted by the speaker 130, thereby achieving different noise reduction effects. For example, the noise reduction mode may include a strong noise reduction mode, an intermediate noise reduction mode, a weak noise reduction mode, or the like. For example, when the user wears the acoustic device 100 indoors, the noise of the external environment is low, the user may turn off the noise reduction mode of the acoustic device 100 or adjust the noise reduction mode to a weak noise reduction mode through the interactive module. As another example, when the user wears the acoustic device 100 and walks in a public place such as a street, the user needs to keep a certain awareness of the surrounding environment while listening to audio signals (e.g., music, voice information) in order to deal with emergencies. In this case, the user may select the intermediate noise reduction mode through the interactive module (e.g., the button or voice assistant) to preserve part of the surrounding environmental noise (e.g., alarm sounds, impact sounds, car horns, etc.). As another example, when taking transportation such as subways or airplanes, the user may select the strong noise reduction mode through the interactive module to further reduce the environmental noise. In some embodiments, the processor 120 may send a prompt message to the acoustic device 100 or a terminal device (e.g., a mobile phone, a smart watch, etc.) communicatively connected with the acoustic device 100 based on an environmental noise intensity to remind the user to adjust the noise reduction mode.

It should be noted that the above description about FIG. 1 is merely provided for the purposes of illustration, and not intended to limit the scope of the present disclosure. Apparently, for persons having ordinary skills in the art, multiple variations and modifications may be conducted under the teachings of the present disclosure. In some embodiments, one or more components (e.g., the one or more sensors 140, the signal transceiver 150, the fixing structure 170, the interaction module, etc.) of the acoustic device 100 may be omitted. In some embodiments, one or more components of the acoustic device 100 may be replaced by other components that may achieve similar functions. For example, the acoustic device 100 may not include the fixing structure 170, and the housing structure 160 or a part thereof may have a human ear-fitting shape (e.g., a circular ring, an oval, a polygonal (regular or irregular), a U-shape, a V-shape, a semi-circular), so that the housing structure 160 may be hung near the user's ears. In some embodiments, one component of the acoustic device 100 may be divided into multiple sub-components, or multiple components of the acoustic device 100 may be combined into a single component. However, those variations and modifications do not depart from the scope of the present disclosure.

Figure 2:
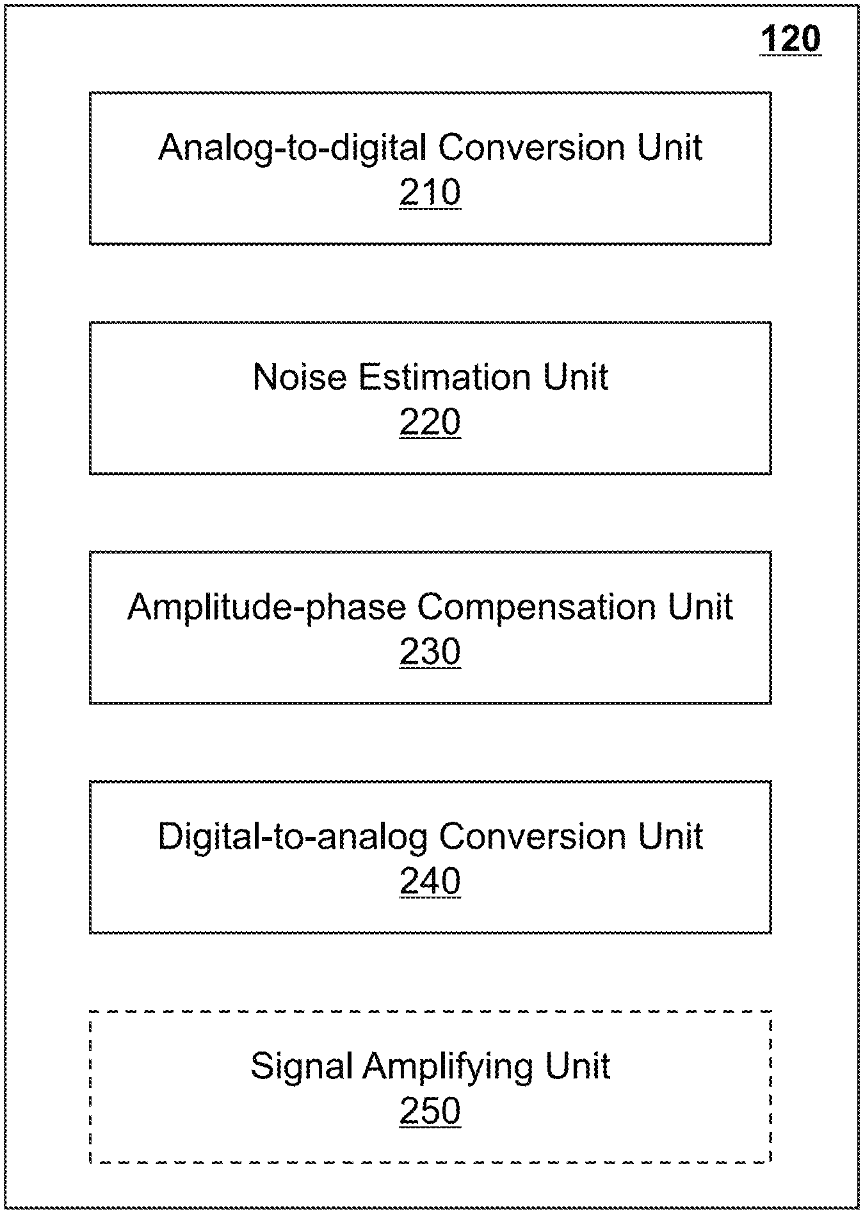
FIG. 2 is a schematic diagram illustrating an exemplary processor according to some embodiments of the present disclosure.

FIG. 2 is a schematic diagram illustrating an exemplary processor 120 according to some embodiments of the present disclosure. As shown in FIG. 2, the processor 120 may include an analog-to-digital conversion unit 210, a noise estimation unit 220, an amplitude-phase compensation unit 230, and a digital-to-analog conversion unit 240.

In some embodiments, the analog-to-digital conversion unit 210 may be configured to convert a signal input by the microphone array 110 into a digital signal. Specifically, the microphone array 110 may acquire environmental noise, convert the acquired environmental noise into an electrical signal, and transmit the electrical signal to the processor 120. After receiving the electrical signal of the environmental noise sent by the microphone array 110, the analog-to-digital conversion unit 210 may convert the electrical signal into a digital signal. In some embodiments, the analog-to-digital conversion unit 210 may be electrically connected to the microphone array 110 and further electrically connected to other components (e.g., the noise estimation unit 220) of the processor 120. Further, the analog-to-digital conversion unit 210 may transmit the converted digital signal of environmental noise to the noise estimation unit 220.

In some embodiments, the noise estimation unit 220 may be configured to estimate the environmental noise based on the received digital signal of the environmental noise. For example, the noise estimation unit 220 may estimate the relevant parameters of the environmental noise at the target spatial position based on the received digital signal of the environmental noise. For example, the parameters may include a noise source (e.g., a position and orientation of the noise source) of the noise at the target spatial position, a transmission direction, an amplitude, a phase, or the like, or any combination thereof. In some embodiments, the noise estimation unit 220 may also be configured to use the microphone array 110 to estimate the sound field at the target spatial position. More descriptions regarding the estimating of the sound field at the target spatial position may be found elsewhere in the present disclosure. See, e.g., FIG. 4 and the relevant descriptions thereof. In some embodiments, the noise estimation unit 220 may be electrically connected to other components (e.g., the amplitude-phase compensation unit 230) of the processor 120. Further, the noise estimation unit 220 may transmit the estimated parameters related to the environmental noise and the sound field at the target spatial position to the amplitude and phase compensation unit 230.

In some embodiments, the amplitude and phase compensation unit 230 may be configured to compensate the estimated parameters related to the environmental noise based on the sound field at the target spatial position. For example, the amplitude and phase compensation unit 230 may compensate the amplitude and phase of the environmental noise according to the sound field at the target spatial position to obtain a digital noise reduction signal. In some embodiments, the amplitude and phase compensation unit 230 may adjust the amplitude of the environmental noise and perform reverse compensation on the phase of the environmental noise to obtain the digital noise reduction signal. The amplitude of the digital noise reduction signal may be approximately equal to that of the digital signal corresponding to the environmental noise. The phase of the digital noise reduction signal may be approximately opposite to that of the digital signal corresponding to the environmental noise. In some embodiments, the amplitude and phase compensation unit 230 may be electrically connected to other components (e.g., the digital-to-analog conversion unit 240) of the processor 120. Further, the amplitude and phase compensation unit 230 may transmit the digital noise reduction signal to the digital-to-analog conversion unit 240.

In some embodiments, the digital-to-analog conversion unit 240 may be configured to convert the digital noise reduction signal into an analog signal (e.g., an electrical signal) to obtain a noise reduction signal. For example, the digital-to-analog conversion unit 240 may include a pulse width modulation (PMW). In some embodiments, the digital-to-analog conversion unit 240 may be electrically connected to other components (e.g., the speaker 130) of the processor 120. Further, the digital-to-analog conversion unit 240 may transmit the noise reduction signal to the speaker 130.

In some embodiments, the processor 120 may include a signal amplifying unit 250. The signal amplifying unit 250 may be configured to amplify the input signal. For example, the signal amplifying unit 250 may amplify the signal input by the microphone array 110. For example, when the acoustic device 100 is in a call state, the signal amplifying unit 250 may be configured to amplify the user's speech sound input by the microphone array 110. As another example, the signal amplifying unit 250 may amplify the amplitude of the environmental noise according to the sound field at the target spatial position. In some embodiments, the signal amplifying unit 250 may be electrically connected to other components (e.g., the microphone array 110, the noise estimation unit 220, and the amplitude and phase compensation unit 230) of the processor 120.

It should be noted that the above description about FIG. 2 is merely provided for the purposes of illustration, and not intended to limit the scope of the present disclosure. Apparently, for persons having ordinary skills in the art, multiple variations and modifications may be conducted under the teachings of the present disclosure. In some embodiments, one or more components (e.g., the signal amplifying unit 250) of the processor 120 may be omitted. In some embodiments, one component of the processor 120 may be divided into multiple sub-components, or multiple components of the processor 120 may be combined into a single component. For example, the noise estimation unit 220 and the amplitude and phase compensation unit 230 may be integrated into one component to realize the functions of the noise estimation unit 220 and the amplitude and phase compensation unit 230. However, those variations and modifications do not depart from the scope of the present disclosure.

Figure 3:
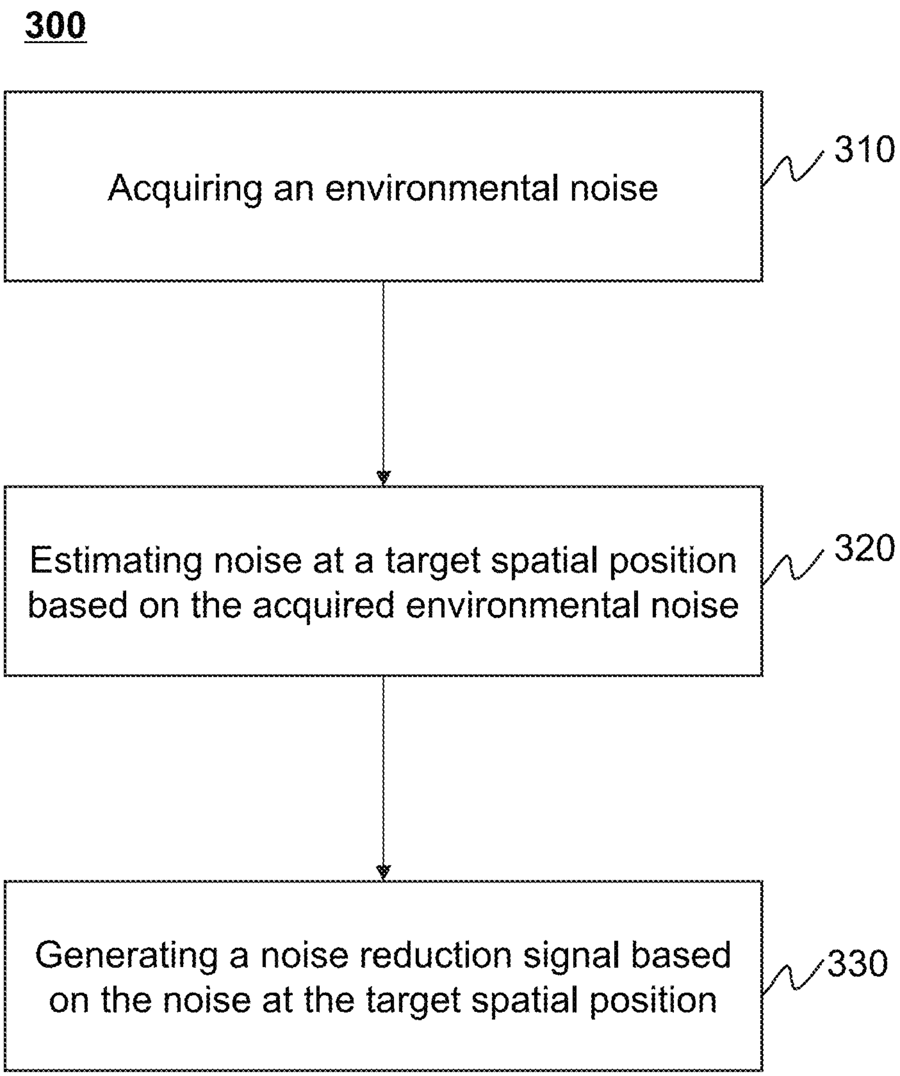
FIG. 3 is a flowchart illustrating an exemplary noise reduction process of an acoustic device according to some embodiments of the present disclosure.

FIG. 3 is a flowchart illustrating an exemplary noise reduction process of an acoustic device according to some embodiments of the present disclosure. In some embodiments, process 300 may be performed by the acoustic device 100. As shown in FIG. 3, process 300 may include the following operations.

In 310, environmental noise may be acquired. In some embodiments, operation 310 may be performed by the microphone array 110.

As described in connection with FIG. 1, environmental noise may refer to a combination of multiple external sounds (e.g., traffic noise, industrial noise, construction noise, social noise) in the environment where a user is located. In some embodiments, the microphone array 110 may be located near an ear canal of the user for picking up environmental noise transmitted to the ear canal of the user. Further, the microphone array 110 may convert the picked-up environmental noise signal into an electrical signal and transmit the electrical signal to the processor 120 for processing.

In 320, noise at the target spatial position may be estimated based on the acquired environmental noise. In some embodiments, operation 320 may be performed by the processor 120.

In some embodiments, the processor 120 may perform a signal separation on the acquired environmental noise. In some embodiments, the environmental noise acquired by the microphone array 110 may include various sounds. The processor 120 may perform signal analysis on the environmental noise acquired by the microphone array 110 to separate the various sounds. Specifically, the processor 120 may adaptively adjust the parameters of a filter according to statistical distribution characteristics and structural characteristics of various sounds in different dimensions such as space, time domain, frequency domain, etc., to estimate parameter information of each sound signal in the environmental noise. The processor 120 may complete the signal separation according to the parameter information of each sound signal. In some embodiments, a statistical distribution characteristic of noise may include a probability distribution density, a power spectral density, an autocorrelation function, a probability density function, a variance, a mathematical expectation, or the like. In some embodiments, a structural characteristic of noise may include a noise distribution, a noise intensity, a global noise intensity, a noise rate, or the like, or any combination thereof. The global noise intensity may refer to an average noise intensity or a weighted average noise intensity. The noise rate may refer to a degree of dispersion of the noise distribution. For example, the environmental noise acquired by the microphone array 110 may include a first signal, a second signal, and a third signal. The processor 120 may obtain a difference between the first signal, the second signal, and the third signal in space (e.g., positions of the signals), time domain (e.g., delay), and frequency domain (e.g., amplitudes, phases of the signals). According to the difference between the first signal, the second signal, and the third signal in the three dimensions, the processor 120 may separate the first signal, the second signal, and the third signal to obtain the relatively pure first signal, second signal, and third signal. Further, the processor 120 may update the environmental noise according to the parameter information (e.g., frequency information, phase information, and amplitude information) of the separated signals. For example, the processor 120 may determine that the first signal is the user's call sound based on the parameter information of the first signal, and remove the first signal from the environmental noise to update the environmental noise. In some embodiments, the removed first signal may be transmitted to a far end of the user's call. For example, when the user wears the acoustic device 100 for a voice call, the first signal may be transmitted to the far end of the voice call.

The target spatial position may be a position located in or near the ear canal of the user determined based on the microphone array 110. As described in connection with FIG. 1, the target spatial position may refer to a spatial position close to the ear canal of the user (e.g., ear hole) by a specific distance (e.g., 0.5 cm, 1 cm, 2 cm, 3 cm). In some embodiments, the target spatial position may be closer to the ear canal of the user than any microphone in the microphone array 110. As described in connection with FIG. 1, the target spatial position may be related to a count of the microphones in the microphone array 110 and/or positions of the microphones relative to the ear canal of the user. The target spatial position may be adjusted by adjusting the count of the microphones in the microphone array 110 and/or the positions of the microphones relative to the ear canal of the user. In some embodiments, the estimating the noise at the target spatial position based on the acquired environmental noise (or the updated environmental noise) may include determining one or more spatial noise sources related to the acquired environmental noise and estimating the noise in the target spatial position based on the one or more spatial noise sources. The environmental noise acquired by the microphone array 110 may come from different azimuths and different types of spatial noise sources. Parameter information (e.g., frequency information, phase information, and amplitude information) corresponding to the spatial noise sources may be different. In some embodiments, the processor 120 may separate and extract the noise at the target spatial position based on the statistical distribution characteristic and structural characteristic of different types of noise in different dimensions (e.g., spatial domain, time domain, frequency domain, etc.), so as to obtain different types of noise (e.g., different frequencies, different phases, etc.). Further, the processor 120 may estimate the parameter information (e.g., amplitude information, phase information, etc.) corresponding to each type of noise. In some embodiments, the processor 120 may determine overall parameter information of the noise at the target spatial position according to the parameter information corresponding to different types of noise at the target spatial position. More descriptions regarding the estimating of the noise at the target spatial position based on the one or more spatial noise sources may be found elsewhere in the present disclosure. See, e.g., FIG. 7, FIG. 8, and the relevant descriptions thereof.

In some embodiments, the estimating the noise at the target spatial position based on the acquired environmental noise (or the updated environmental noise) may include constructing a virtual microphone based on the microphone array 110 and estimating the noise at the target spatial position based on the virtual microphone. More descriptions regarding the estimating of the noise at the target spatial position based on the virtual microphone may be found elsewhere in the present disclosure. See, e.g., FIG. 9, FIG. 10, and the relevant descriptions thereof.

In 330, a noise reduction signal may be generated based on the noise at the target spatial position. In some embodiments, operation 330 may be performed by the processor 120.

In some embodiments, the processor 120 may generate the noise reduction signal based on the parameter information (e.g., amplitude information, phase information, etc.) of the noise at the target spatial position obtained in operation 320. In some embodiments, a phase difference between the phase of the noise reduction signal and the phase of the noise at the target spatial position may be less than or equal to a preset phase threshold. The preset phase threshold may be in a range of 90-180 degrees. The preset phase threshold may be adjusted within this range according to the needs of the user. For example, when the user does not want to be disturbed by the sound of the surrounding environment, the preset phase threshold may be a larger value, such as 180 degrees, that is, the phase of the noise reduction signal is opposite to the phase of the noise at the target spatial position. As another example, when the user wants to be sensitive to the surrounding environment, the preset phase threshold may be a small value, such as 90 degrees. It should be noted that the more sound of the surrounding environment the user wants to receive, the closer the preset phase threshold may be to 90 degrees; the less sound of the surrounding environment the user wants to receive, the closer the preset phase threshold may be to 180 degrees. In some embodiments, when the phase of the noise reduction signal and the phase of the noise at the target spatial position are constant (e.g., the phase is opposite), an amplitude difference between the amplitude of the noise at the target spatial position and the amplitude of the noise reduction signal may be less than or equal to a preset amplitude threshold. For example, when the user does not want to be disturbed by the sound of the surrounding environment, the preset amplitude threshold may be a smaller value, such as 0 dB, that is, the amplitude of the noise reduction signal is equal to the amplitude of the noise at the target spatial position. As another example, when the user wants to be sensitive to the surrounding environment, the preset amplitude threshold may be a larger value, for example, approximately equal to the amplitude of the noise at the target spatial position. It should be noted that the more sound of the surrounding environment the user wants to receive, the closer the preset amplitude threshold may be to the amplitude of the noise at the target spatial position; the less sound of the surrounding environment the user wants to receive, the closer the preset amplitude threshold may be to 0 dB.

In some embodiments, the speaker 130 may output a target signal based on the noise reduction signal generated by the processor 120. For example, the speaker 130 may convert the noise reduction signal (e.g., an electrical signal) into the target signal (i.e., a vibration signal) based on a vibration component in the speaker 130. The target signal and the environmental noise may offset each other. In some embodiments, when the noise at the target spatial position has multiple spatial noise sources, the speaker 130 may output target signals corresponding to the multiple spatial noise sources based on the noise reduction signal. For example, the multiple spatial noise sources may include a first spatial noise source and a second spatial noise source. The speaker 130 may output a first target signal with a phase approximately opposite to that of the noise of the first spatial noise source and an amplitude approximately equal to that of the noise of the first spatial noise source to offset the noise of the first spatial noise source. The speaker 130 may output a second target signal with a phase approximately opposite to that of the noise of the second spatial noise source and an amplitude approximately equal to that of the noise of the second spatial noise source to offset the noise of the second spatial noise source. In some embodiments, when the speaker 130 is an air conduction speaker, a position where the target signal and the environmental noise offset each other may be the target spatial position. A distance between the target spatial position and the user's ear canal may be small, and the noise at the target spatial position may be approximately regarded as the noise at the user's ear canal. Therefore, the target signal and the noise at the target spatial position offset each other, which may be approximated as the environmental noise transmitted to the user's ear canal is eliminated, thereby realizing the active noise reduction of the acoustic device 100. In some embodiments, when the speaker 130 is a bone conduction speaker, the position where the target signal and the environmental noise offset each other may be the basement membrane of the user. The target signal and the environmental noise offset each other at the basement membrane of the user, thereby realizing the active noise reduction of the acoustic device 100.

It should be noted that the above description about process 300 is merely provided for the purposes of illustration, and not intended to limit the scope of the present disclosure. Apparently, for persons having ordinary skills in the art, multiple variations and modifications to process 300 may be conducted under the teachings of the present disclosure. For example, operations in the process 300 may be added, omitted, or combined. As another example, signal processing (e.g., filtering processing, etc.) may be performed on the environmental noise. However, those variations and modifications do not depart from the scope of the present disclosure.

Figure 4:
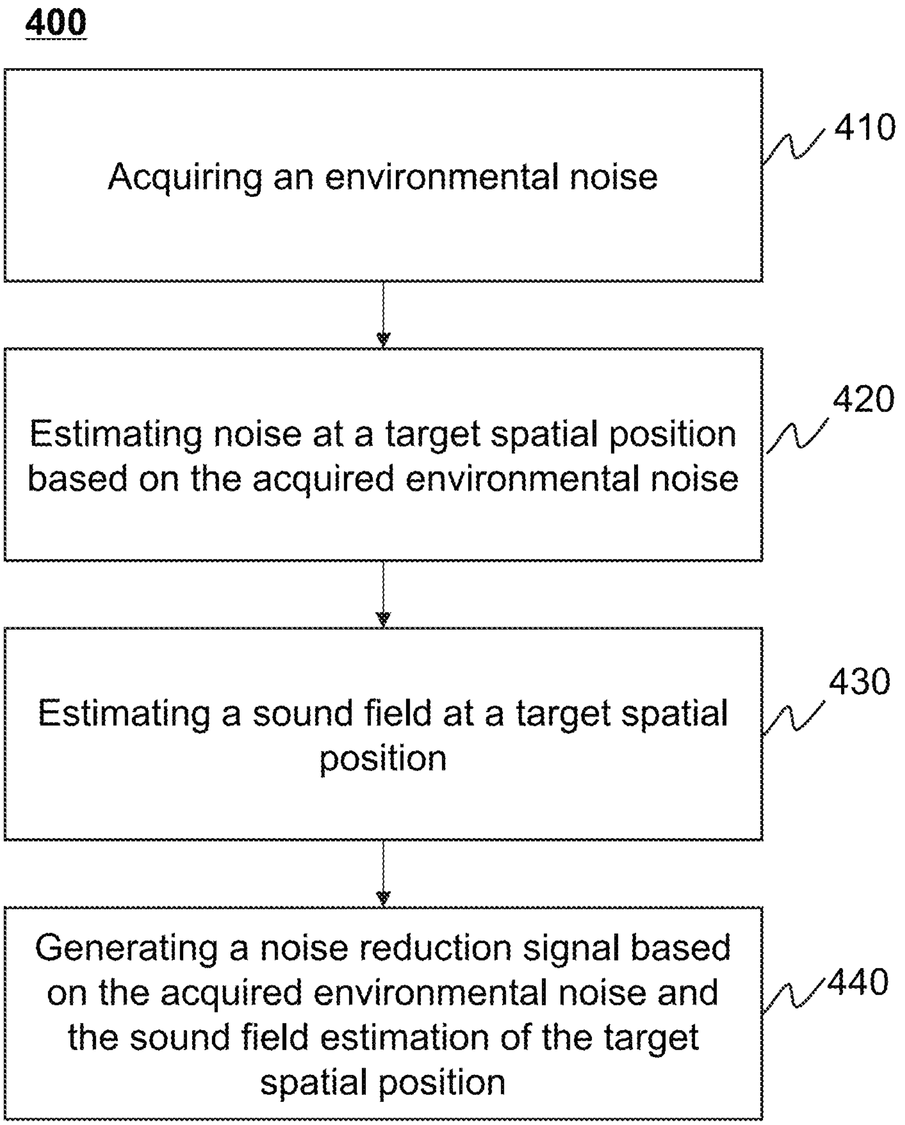
FIG. 4 is a flowchart illustrating an exemplary noise reduction process of an acoustic device according to some embodiments of the present disclosure.

FIG. 4 is a flowchart illustrating an exemplary noise reduction process of an acoustic device according to some embodiments of the present disclosure. In some embodiments, process 400 may be performed by the acoustic device 100. As shown in FIG. 4, the process 400 may include the following operations.

In 410, environmental noise may be acquired. In some embodiments, operation 410 may be performed by the microphone array 110. In some embodiments, operation 410 may be performed in a similar manner as operation 310, and relevant descriptions are not repeated here.

In 420, a noise at the target spatial position may be estimated based on the acquired environmental noise. In some embodiments, operation 420 may be performed by the processor 120. In some embodiments, operation 420 may be performed in a similar manner as operation 320, and relevant descriptions are not repeated here.

In 430, a sound field at a target spatial position may be estimated. In some embodiments, operation 430 may be performed by the processor 120.

In some embodiments, the processor 120 may estimate the sound field at the target spatial position using the microphone array 110. Specifically, the processor 120 may construct a virtual microphone based on the microphone array 110 and estimate the sound field at the target spatial position based on the virtual microphone. More descriptions regarding the estimating of the sound field at the target spatial position based on the virtual microphone may be found elsewhere in the present disclosure. See, e.g., FIG. 9, FIG. 10, and the relevant descriptions thereof.

In 440, a noise reduction signal may be generated based on the acquired environmental noise and the sound field estimation of the target spatial position. In some embodiments, operation 440 may be performed by the processor 120.

In some embodiments, the processor 120 may obtain physical quantities (e.g., a sound pressure, a sound frequency, a sound amplitude, a sound phase, a sound source vibration velocity, a medium (e.g., air) density, etc.) related to the sound field at the target spatial position obtained in operation 430. The processor 120 may further adjust parameter information (e.g., frequency information, amplitude information, phase information) of the noise at the target spatial position to generate the noise reduction signal. For example, the processor 120 may determine whether a physical quantity (e.g., the sound frequency, the sound amplitude, and the sound phase) related to the sound field is the same as the parameter information of the noise at the target spatial position. If the physical quantity related to the sound field is the same as the parameter information of the noise at the target spatial position, the processor 120 may not adjust the parameter information of the noise at the target spatial position. If the physical quantity related to the sound field is different from the parameter information of the noise at the target spatial position, the processor 120 may determine a difference between the physical quantity related to the sound field and the parameter information of the noise at the target spatial position, and adjust the parameter information of the noise at the target spatial position based on the difference. For example, when the difference is greater than a certain range, the processor 120 may use an average value of the physical quantity related to the sound field and the parameter information of the noise at the target spatial position as the adjusted parameter information of the noise at the target spatial position and generate the noise reduction signal based on the adjusted parameter information of the noise at the target spatial position. As another example, since the noise in the environment is constantly changing, when the processor 120 generates the noise reduction signal, the noise at the target spatial position in the actual environment may have changed slightly. Therefore, the processor 120 may estimate a change of the parameter information of the environmental noise at the target spatial position based on time information when the microphone array picks up the environmental noise, current time information, and physical quantities (e.g., the sound source vibration velocity, the medium (e.g., air) density) related to the sound field at the target spatial position. The processor 120 may further adjust the parameter information of the noise at the target spatial position based on the change. After the above adjustment, the amplitude information and frequency information of the noise reduction signal may be more consistent with the amplitude information and frequency information of the environmental noise at the current target spatial position; the phase information of the noise reduction signal may be more consistent with the inverse phase information of the environmental noise at the current target spatial position, so that the noise reduction signal may eliminate or reduce environmental noise more accurately, thereby improving the noise reduction effect and the user's hearing experience.

In some embodiments, when a position of the acoustic device 100 changes, for example, when a head of the user wearing the acoustic device 100 rotates, the environmental noise (e.g., a noise direction, an amplitude, and a phase of the environmental noise) may change accordingly. A speed at which the acoustic device 100 performs noise reduction may be difficult to keep up with a changing speed of the environmental noise, which may result in a failure of the active noise reduction function and even an increase of noise. To solve the above mentioned problems, the processor 120 may acquire motion information (e.g., a motion trajectory, a motion direction, a motion speed, a motion acceleration, a motion angular velocity, motion-related time information) of the acoustic device 100 by using one or more sensors 140 of the acoustic device 100 to update the noise at the target spatial position and the sound field estimation of the target spatial position. Further, the processor 120 may generate the noise reduction signal based on the updated noise at the target spatial position and the sound field estimation of the target spatial position. The one or more sensors 140 may record the motion information of the acoustic device 100, and the processor 120 may quickly update the noise reduction signal, which may improve a noise tracking performance of the acoustic device 100, so that the noise reduction signal may eliminate or reduce the environmental noise more accurately, thereby improving the noise reduction effect and the user's hearing experience.

In some embodiments, the processor 120 may divide the acquired environmental noise into a plurality of frequency bands. The plurality of frequency bands may correspond to different frequency ranges. For example, the processor 120 may divide the picked-up environmental noise into four frequency bands of 100-300 Hz, 300-500 Hz, 500-800 Hz, and 800-1500 Hz. In some embodiments, each frequency band may contain parameter information (e.g., frequency information, amplitude information, and phase information)

of the environmental noise in the corresponding frequency range. For at least one of the plurality of frequency bands, the processor 120 may perform operations 420-440 thereon to generate a noise reduction signal corresponding to each of the at least one frequency band. For example, the processor 120 may perform operations 420-440 on the frequency band 300-500 Hz and the frequency band 500-800 Hz among the four frequency bands to generate noise reduction signals corresponding to the frequency band 300-500 Hz and the frequency band 500-800 Hz, respectively. Further, in some embodiments, the speaker 130 may output a target signal corresponding to each frequency band based on the noise reduction signal corresponding to the frequency band. For example, the speaker 130 may output a target signal with approximately opposite phase and approximately equal amplitude to the noise of the frequency band 300-500 Hz to offset the noise of the frequency band 300-500 Hz, and a target signal with approximately opposite phase and approximately equal amplitude to the noise of the frequency band 500-800 Hz to offset the noise of the frequency band 500-800 Hz.

In some embodiments, the processor 120 may update the noise reduction signal based on a user's manual input. For example, when the user wears the acoustic device 100 to play music in a noisy external environment, the user's own auditory experience is not ideal, the user may manually adjust the parameter information (e.g., frequency information, phase Information, amplitude information) of the noise reduction signal based on the auditory experience. As another example, when a special user (e.g., a hearing impaired user or an older user) uses the acoustic device 100, a hearing ability of the special user is different from that of the ordinary user, the noise reduction signal generated by the acoustic device 100 itself may be unable to meet the needs of the special user, which may result in a poor hearing experience for the special user. In this case, adjustment multiples of the parameter information of the noise reduction signal may be set in advance. The special user may adjust the noise reduction signal according to their own auditory effects and the adjustment multiples of parameter information of the noise reduction signal, thereby updating the noise reduction signal to improve the hearing experience of the special user. In some embodiments, the user may manually adjust the noise reduction signal through a key on the acoustic device 100. In other embodiments, the user may adjust the noise reduction signal through a terminal device. Specifically, the acoustic device 100 or an external device (e.g., a mobile phone, a tablet computer, or a computer) that communicates with the acoustic device 100 may display suggested parameter information of the noise reduction signal to the user. The user may slightly adjust the parameter information of the noise reduction signal according to their own hearing experience.

It should be noted that the above description about process 400 is merely provided for the purposes of illustration, and not intended to limit the scope of the present disclosure. Apparently, for persons having ordinary skills in the art, multiple variations and modifications to process 400 may be conducted under the teachings of the present disclosure. For example, operations in the process 400 may be added, omitted, or combined. However, those variations and modifications do not depart from the scope of the present disclosure.

FIGS. 5A-5D are schematic diagrams illustrating exemplary arrangements of microphone arrays (e.g., the microphone array 110) according to some embodiments of the present disclosure. In some embodiments, the arrangement of a microphone array may be a regular geometric shape. As shown in FIG. 5A, the microphone array may be a linear array. In some embodiments, the arrangement of a microphone array may also be other shapes. For example, as shown in FIG. 5B, the microphone array may be a cross-shaped array. As another example, as shown in FIG. 5C, the microphone array may be a circular array. In some embodiments, the arrangement of a microphone array may also be an irregular geometric shape. For example, as shown in FIG. 5D, the microphone array may be an irregular array. It should be noted that the arrangement of a microphone array is not limited to the linear array, the cross-shaped array, the circular array, and the irregular array shown in FIGS. 5A-5D. The arrangement of a microphone array may also be other shaped arrays, such as a triangular array, a spiral array, a planar array, a three-dimensional array, a radial array, or the like, which may not be limited in the present disclosure.

In some embodiments, each short solid line in FIGS. 5A-5D may be regarded as a microphone or a group of microphones. When each short solid line is regarded as a group of microphones, a count of microphones in each group of microphones may be the same or different, types of the microphones in each group of microphones may be the same or different, and orientations of the microphones in each group of microphones may be the same or different. The types, counts, and orientations of the microphones may be adjusted adaptively according to an actual application condition, which may not be limited in the present disclosure.

In some embodiments, the microphones in a microphone array may be uniformly distributed. The uniform distribution herein refers to that a distance between any two adjacent microphones in the microphone array is the same. In some embodiments, the microphones in the microphone array may also be non-uniformly distributed. The non-uniform distribution herein refers to that the distance between any two adjacent microphones in the microphone array is different. The distance between the microphones in the microphone array may be adjusted adaptively according to the actual application condition, which may not be limited in the present disclosure.

Figure 6A:
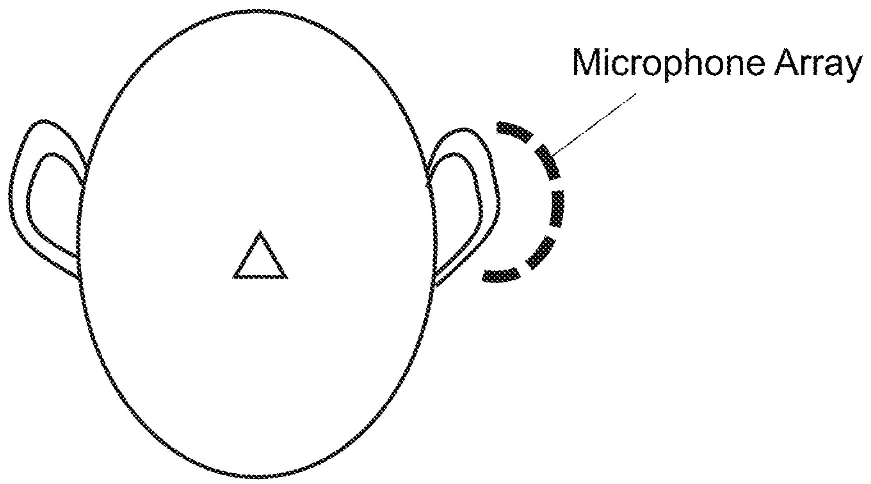
FIGS. 6A-6B are schematic diagrams illustrating exemplary arrangements of microphone arrays according to some embodiments of the present disclosure.
Figure 6B:
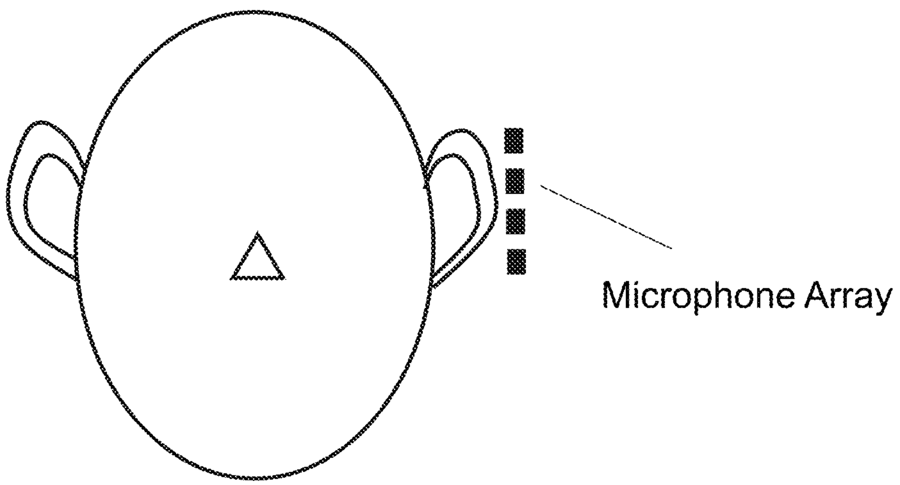

FIGS. 6A and 6B are schematic diagrams illustrating exemplary arrangements of microphone arrays (e.g., the microphone arrays 110) according to some embodiments of the present disclosure. As shown in FIG. 6A, when a user wears an acoustic device with a microphone array, the microphone array may be arranged at or around the human ear in a semicircular arrangement. As shown in FIG. 6B, the microphone array may be arranged at the human ear in a linear arrangement. It should be noted that the arrangement of the microphone array may not be limited to the semicircular and linear shapes shown in FIGS. 6A and 6B. The arranged positions of the microphone array may not be limited to those shown in FIGS. 6A and 6B. The semicircular and linear shapes and the arranged positions of the microphone arrays are merely provided for the purposes of illustration.

Figure 7:
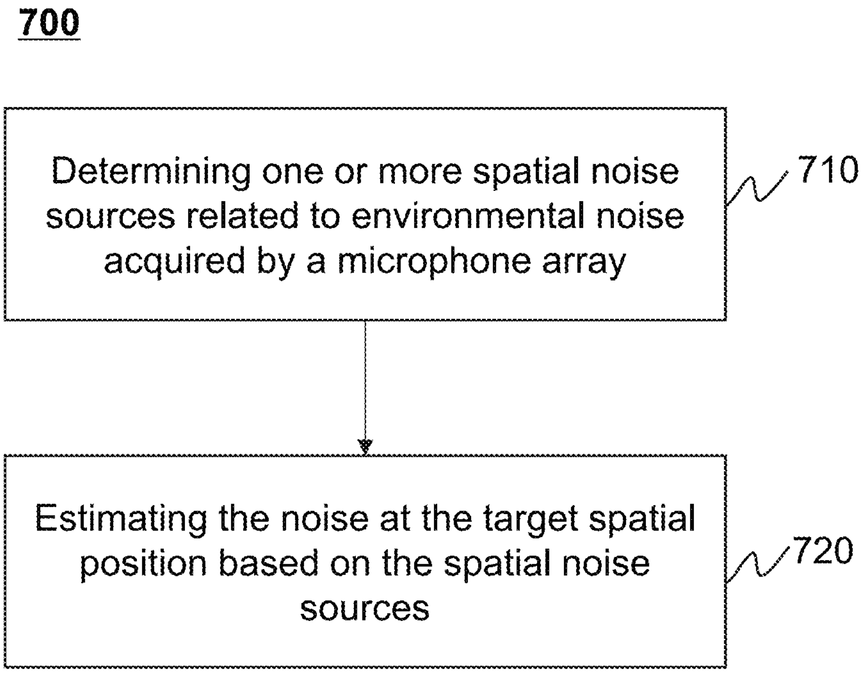
FIG. 7 is a flowchart illustrating an exemplary process for estimating noise at a target spatial position according to some embodiments of the present disclosure.

FIG. 7 is a flowchart illustrating an exemplary process for noise estimation of a target spatial position according to some embodiments of the present disclosure. As shown in FIG. 7, process 700 may include the following operations.

In 710, one or more spatial noise sources related to environmental noise acquired by a microphone array may be determined. In some embodiments, operation 710 may be performed by the processor 120. As described in the present disclosure, determining a spatial noise source refers to determining related information of the spatial noise source, for example, a position of the spatial noise source (including an orientation of the spatial noise source, a distance between the spatial noise source and the target spatial position, etc.), a phase of the noise of the spatial noise source, and an amplitude of the noise of the spatial noise source, etc.

In some embodiments, a spatial noise source related to the environmental noise refers to a noise source whose sound waves may be transmitted to a position (e.g., a target spatial position) at or close to an ear canal of the user. In some embodiments, the spatial noise sources may be noise sources located in different directions (e.g., front, rear, etc.) of the user's body. For example, there may be a crowd noise in front of the user's body and a vehicle whistling noise on the left of the user's body. In this case, the spatial noise sources may include a crowd noise source in front of the user's body and a vehicle whistling noise source on the left of the user's body. In some embodiments, the microphone array (e.g., the microphone array 110) may acquire spatial noises in various directions of the user's body, convert the spatial noises into electrical signals, and transmit the electrical signals to the processor 120. The processor 120 may analyze the electrical signals corresponding to the spatial noises to obtain parameter information (e.g., frequency information, amplitude information, phase information, etc.) of the acquired spatial noise in each direction. The processor 120 may determine the information of the spatial noise source in each direction according to the parameter information of the spatial noise in each direction, for example, the position of the spatial noise source, the distance of the spatial noise source, the phase of the noise of the spatial noise source, and the amplitude of the noise of the spatial noise source. In some embodiments, the processor 120 may determine a spatial noise source through a noise location algorithm based on spatial noise acquired by the microphone array (e.g., the microphone array 110). The noise location algorithm may include a beamforming algorithm, a super-resolution spatial spectrum estimation algorithm, a time difference of arrival algorithm (also referred to as a time delay estimation algorithm), or the like, or any combination thereof. The beamforming algorithm is a sound source localization manner based on the controllable beamforming of the maximum output power. For example, the beamforming algorithm may include a steering response power-phase transform (SPR-PHAT) algorithm, a delay-and-sum beamforming, a differential microphone algorithm, a generalized sidelobe canceller (GSC) algorithm, a minimum variance distortionless response (MVDR) algorithm, etc. The super-resolution spatial spectrum estimation algorithm may include an autoregressive AR model, a minimum variance (MV) spectrum estimation, and an eigenvalue decomposition manner (e.g., a multiple signal classification (MUSIC) algorithm), etc. By these algorithms, a correlation matrix of a spatial spectrum may be calculated by obtaining the sound signal (e.g., the spatial noise) acquired by the microphone array, and the direction of the spatial noise source may be effectively estimated. By the time difference of arrival algorithm, an arrival time difference of the sound may be estimated, and a time difference of arrival (TDOA) between the microphones in the microphone array may be obtained. Further, the position of the spatial noise source may be determined based on the obtained TDOA and the known spatial position of the microphone array.

For example, by the time delay estimation algorithm, time differences when the environmental noise signal is transmitted to different microphones in the microphone array may be calculated, and the position of the noise source may be determined through a geometric relationship. As another example, by the SPR-PHAT algorithm, beamforming may be performed in a direction of each noise source, and a direction with a strongest beam energy may be approximately regarded as the direction of the noise source. As another example, by the MUSIC algorithm, an eigenvalue decomposition may be performed on a covariance matrix of the environmental noise signal acquired by the microphone array to obtain a subspace of the environmental noise signal, thereby separating the direction of the environmental noise. More descriptions regarding the determining of the noise source may be found elsewhere in the present disclosure. See, e.g., FIG. 8 and the relevant descriptions thereof.

In some embodiments, a spatial super-resolution image of the environmental noise may be formed by manners such as synthetic aperture, sparse recovery, and coprime array. The spatial super-resolution image may present a signal reflection map of the environmental noise, which may improve the positioning accuracy of the spatial noise source.

In some embodiments, the processor 120 may divide the picked-up environmental noise into a plurality of frequency bands according to a specific frequency bandwidth (e.g., every 500 Hz as a frequency band). The plurality of frequency bands may correspond to different frequency ranges. The processor 120 may determine the spatial noise source corresponding to at least one of the plurality of frequency bands. For example, the processor 120 may perform signal analysis on the divided frequency bands to obtain parameter information of environmental noise corresponding to each frequency band, and determine the spatial noise source corresponding to each frequency band based on the parameter information. As another example, the processor 120 may determine the spatial noise source corresponding to each frequency band by the noise location algorithm.

In 720, the noise at the target spatial position may be estimated based on the spatial noise sources. In some embodiments, operation 720 may be performed by the processor 120. As described in the present disclosure, the estimating the noise at the target spatial position refers to estimating the parameter information (e.g., frequency information, amplitude information, phase information, etc.) of the noise at the target spatial position.

In some embodiments, the processor 120 may estimate, based on the parameter information (e.g., frequency information, amplitude information, phase information, etc.) of the spatial noise sources located in various directions of the user's body obtained in operation 720, the parameter information of the noise transmitted from each spatial noise source to the target spatial position, thereby estimating the noise at the target spatial position. For example, there may be a spatial noise source located at a first position (e.g., the front) of the user's body and a spatial noise source located at a second position (e.g., the rear) of the user's body. The processor 120 may estimate, based on the position information, frequency information, phase information, or amplitude information of the spatial noise source at the first position, the frequency information, phase information, or amplitude information of noise of the spatial source at the first position when the noise of the spatial noise source at the first position is transmitted to the target spatial position. The processor 120 may estimate, based on the position information, frequency information, phase information, or amplitude information of the spatial noise source at the second position, the frequency information, phase information, or amplitude information of the spatial noise source at the second position when the noise of the spatial noise source at the second position is transmitted to the target spatial position. Further, the processor 120 may estimate the noise information of the target spatial position based on the frequency information, phase information, or amplitude information of the spatial noise source at the first position and the spatial noise source at the second position, thereby estimating the noise information of the noise at the target spatial position. For example, the processor 120 may use a virtual microphone technique or other manners to estimate the noise information of the target spatial position. In some embodiments, the processor 120 may extract, using a feature extraction manner, the parameter information of the noise of the spatial noise source from a frequency response curve of the spatial noise source acquired by the microphone array. In some embodiments, the manner for extracting the parameter information of the noise of the spatial noise source may include but is not limited to, a principal components analysis (PCA), an independent component algorithm (ICA), a linear discriminant analysis (LDA), a singular value decomposition (SVD), etc.

It should be noted that the above description about process 700 is merely provided for the purposes of illustration, and not intended to limit the scope of the present disclosure. Apparently, for persons having ordinary skills in the art, multiple variations and modifications to process 700 may be conducted under the teachings of the present disclosure. For example, the process 700 may further include operations of positioning the spatial noise source, extracting the parameter information of the noise of the spatial noise source, etc. As another example, operation 710 and operation 720 may be combined into one operation. However, those variations and modifications do not depart from the scope of the present disclosure.

Figure 8:
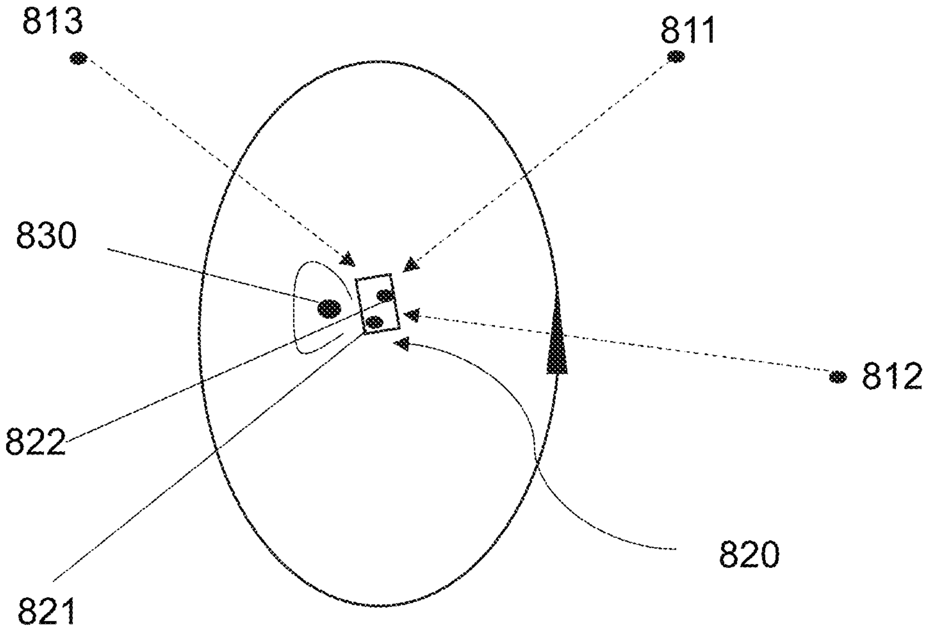
FIG. 8 is a schematic diagram illustrating how to estimate noise at a target spatial position according to some embodiments of the present disclosure.

FIG. 8 is a schematic diagram illustrating how to estimate noise at a target spatial position according to some embodiments of the present disclosure. A time difference of arrival algorithm may be taken as an example to illustrate how a position of a spatial noise source is determined. As shown in FIG. 8, a processor (e.g., the processor 120) may calculate time differences of noise signals generated by noise sources (e.g., 811, 812, 813) to be transmitted to different microphones (e.g., a microphone 821, a microphone 822, etc.) in a microphone array 820. Further, the processor may determine the positions of the noise sources based on the known spatial position of the microphone array 820 and positional relationships (e.g., a distance, a relative orientation) between the microphone array 820 and the noise sources.

After the positions of the noise sources (e.g., 811, 812, 813) are obtained, the processor may estimate a phase delay and an amplitude change of a noise signal transmitted from each noise source to a target spatial position 830 based on a position of the noise source. The processor may obtain parameter information (e.g., frequency information, amplitude information, phase information, etc.) when the environmental noise is transmitted to the target spatial position 830 based on the phase delay, the amplitude change, and the parameter information (e.g., frequency information, amplitude information, phase information, etc.) of the noise signal emitted by each spatial noise source, thereby estimating the noise at the target spatial position.

It should be noted that the above description about the noise sources 811, 812, and 813, the microphone array 820, the microphones 821 and 822 in the microphone array 820, and the target spatial position 830 described in FIG. 8 is merely provided for the purposes of illustration, and not intended to limit the scope of the present disclosure. Apparently, for persons having ordinary skills in the art, multiple variations and modifications may be conducted under the teachings of the present disclosure. For example, the microphone array 820 may include more microphones other than the microphone 821 and the microphone 822. However, those variations and modifications do not depart from the scope of the present disclosure.

Figure 9:
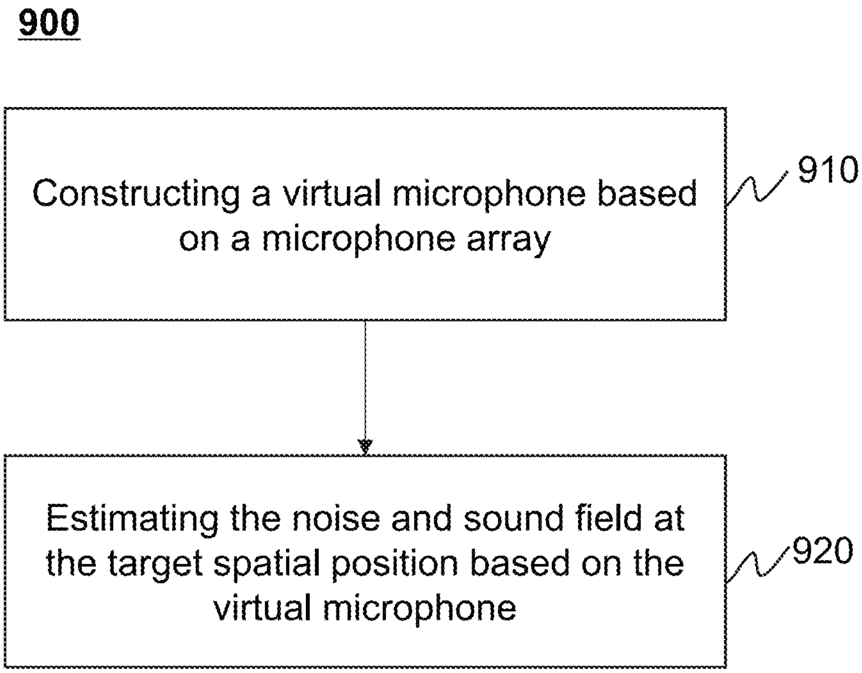
FIG. 9 is a flowchart illustrating an exemplary process for estimating a sound field and noise at a target spatial position according to some embodiments of the present disclosure.

FIG. 9 is a flowchart illustrating an exemplary process for estimating a sound field and noise at a target spatial position according to some embodiments of the present disclosure. As shown in FIG. 9, process 900 may include the following operations.

In 910, a virtual microphone may be constructed based on a microphone array (e.g., the microphone array 110, the microphone array 820). In some embodiments, operation 910 may be performed by the processor 120.

In some embodiments, the virtual microphone may be configured to indicate or simulate audio data collected by a microphone if the target spatial position includes the microphone. That is, the audio data obtained by the virtual microphone may be approximated or equivalent to audio data collected by a physical microphone if the physical microphone is located at the target spatial position.

In some embodiments, the virtual microphone may include a mathematical model. The mathematical model may indicate a relationship between the noise estimation or the sound field estimation of the target spatial position and the parameter information (e.g., frequency information, amplitude information, phase information, etc.) of the environmental noise acquired by the microphone array and parameters of the microphone array. The parameters of the microphone array may include an arrangement of the microphone array, a distance between the microphones in the microphone array, a count (or number) and positions of the microphones in the microphone array, or the like, or any combination thereof. The mathematical model may be obtained using an initial mathematical model, based on the parameters of the microphone array, and the parameter information (e.g., frequency information, amplitude information, phase information, etc.) of sound (e.g., environmental noise) acquired by the microphone array. For example, the initial mathematical model may include model parameters and parameters corresponding to the parameters of the microphone array and the parameter information of the environmental noise acquired by the microphone array. The parameters of the microphone array, the parameter information of the sound acquired by the microphone array, and initial values of the model parameters may be input into the initial mathematical model to obtain a predicted noise or sound field at the target spatial position. Further, the predicted noise or sound field may be compared with data (noise estimation and sound field estimation) obtained by the physical microphone located at the target spatial position to adjust the model parameters of the mathematical model. According to the above adjustment manner, the mathematical model may be obtained by multiple adjustments based on a large amount of data (e.g., the parameters of the microphone array and the parameter information of the environmental noise acquired by the microphone array).

In some embodiments, the virtual microphone may include a trained machine learning model. The trained machine learning model may be obtained through a training process based on the parameters of the microphone array and the parameter information (e.g., frequency information, amplitude information, phase information, etc.) of the sound (e.g., environmental noise) acquired by the microphone array. For example, the parameters of the microphone array and the parameter information of the sound acquired by the microphone array may be used as training samples to train an initial machine learning model (e.g., a neural network model) to obtain the machine learning model. Specifically, the parameters of the microphone array and the parameter information of the sound acquired by the microphone array may be input into the initial machine learning model to obtain a prediction result (e.g., the noise estimation and the sound field estimation of the target spatial position). Then, the prediction result may be compared with the data (noise estimation and sound field estimation) obtained by the physical microphone located at the target spatial position to adjust the parameters of the initial machine learning model. According to the above adjustment manner, the parameters of the initial machine learning model may be optimized by multiple iterations based on a large amount of data (e.g., the parameters of the microphone array and the parameter information of the environmental noise acquired by the microphone array) until the prediction result of the initial machine learning model is the same or approximately the same as the data obtained by the physical microphone located at the spatial position. As a result, the trained machine learning model may be obtained.

The virtual microphone may be arranged at a location (e.g., the target spatial position) where it is difficult to place the physical microphone and replace the function of the physical microphone. For example, in order to achieve the purpose of opening the user's ears and not blocking the user's ear canal, the physical microphone cannot be set at the position (e.g., the target spatial position) of the user's ear hole. In this case, the microphone array may be arranged at a position (e.g., the user's auricle, etc.) close to the user's ears and not blocking the ear canal, and then a virtual microphone may be constructed at the position of the user's ear hole based on the microphone array. The virtual microphone technique may use the physical microphone (i.e., the microphone array) at a first position to predict sound data (e.g., an amplitude, a phase, a sound pressure, a sound field, etc.) at a second position (e.g., the target spatial position). In some embodiments, the sound data at the second position (also referred to as a specific position, such as the target spatial position) predicted by the virtual microphone may be adjusted based on a distance between the virtual microphone and the physical microphone (i.e., the microphone array) and a type of the virtual microphone (e.g., the mathematical model virtual microphone, the machine learning virtual microphone). For example, the smaller the distance between the virtual microphone and the physical microphone (i.e., the microphone array), the more accurate the sound data of the second position predicted by the virtual microphone. As another example, in some specific application scenarios, the sound data of the second position predicted by the machine learning virtual microphone may be more accurate than that predicted by the mathematical model virtual microphone. In some embodiments, the position (i.e., the second position, e.g., the target spatial position) corresponding to the virtual microphone may be near the microphone array or far away from the microphone array.

In 920, the noise and sound field at the target spatial position may be estimated based on the virtual microphone. In some embodiments, operation 920 may be performed by the processor 120.

In some embodiments, the virtual microphone may be a mathematical model, and the processor 120 may input the parameter information (e.g., frequency information, amplitude information, phase information, etc.) of the environmental noise acquired by the microphone array and the parameters of the microphone array (e.g., the arrangement of the microphone array, the distance between the microphones in the microphone array, the count of the microphones in the microphone array) as the parameters of the mathematical model into the mathematical model in real-time to estimate the noise and sound field at the target spatial position.

In some embodiments, the virtual microphone may be a trained machine learning model, the processor 120 may input the parameter information (e.g., frequency information, amplitude information, phase information, etc.) of the environmental noise acquired by the microphone array and the parameters of the microphone array (e.g., the arrangement of the microphone array, the distance between the microphones in the microphone array, the count of the microphones in the microphone array) into the machine learning model in real-time and estimate the noise and sound field at the target spatial position based on an output of the machine learning model.

It should be noted that the above description about process 900 is merely provided for the purposes of illustration, and not intended to limit the scope of the present disclosure. Apparently, for persons having ordinary skills in the art, multiple variations and modifications to process 900 may be conducted under the teachings of the present disclosure. For example, operation 920 may be divided into two operations to estimate the noise and the sound field at the target spatial position, respectively. However, those variations and modifications do not depart from the scope of the present disclosure.

Figure 10:
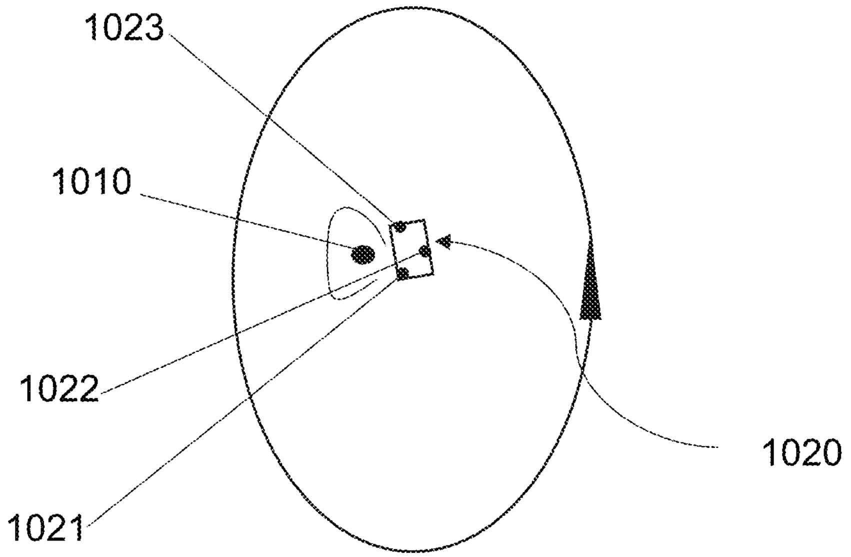
FIG. 10 is a schematic diagram illustrating how to construct a virtual microphone according to some embodiments of the present disclosure.

FIG. 10 is a schematic diagram illustrating how to construct a virtual microphone according to some embodiments of the present disclosure. As shown in FIG. 10, a target spatial position 1010 may be located near an ear canal of a user. In order to achieve the purpose of opening the user's ears and not blocking the ear canal, the target spatial position 1010 cannot be provided with a physical microphone, so that noise and sound field at the target spatial position 1010 cannot be directly estimated by the physical microphone.

In order to estimate the noise and sound field at the target spatial position 1010, a microphone array 1020 may be provided in the vicinity of the target spatial position 1010. Merely by way of example, as shown in FIG. 10, the microphone array 1020 may include a first microphone 1021, a second microphone 1022, and a third microphone 1023. Each microphone (e.g., the first microphone 1021, the second microphone 1022, the third microphone 1023) in the microphone array 1020 may acquire environmental noise at a position where the user is located. The processor 120 may construct a virtual microphone based on parameter information (e.g., frequency information, amplitude information, phase information, etc.) of the environmental noise acquired by the microphones in the microphone array 1020 and parameters of the microphone array 1020 (e.g., an arrangement of the microphone array 1020, a relationship between the microphones in the microphone array 1020, a count of the microphones in the microphone array 1020). The processor 120 may further estimate the noise and sound field at the target spatial position 1010 based on the virtual microphone.

It should be noted that the above description about the target spatial position 1010, the microphone array 1020, and the first microphone 1021, the second microphone 1022, and the third microphone 1023 in the microphone array 1020 described in FIG. 10 is merely provided for the purposes of illustration, and not intended to limit the scope of the present disclosure. Apparently, for persons having ordinary skills in the art, multiple variations and modifications may be conducted under the teachings of the present disclosure. For example, the microphone array 1020 may include more microphones other than the first microphone 1021, the second microphone 1022, and the third microphone 1023.

However, those variations and modifications do not depart from the scope of the present disclosure.

In some embodiments, the microphone array (e.g., the microphone array 110, the microphone array 820, the microphone array 1020) may acquire an interference signal (e.g., the target signal and other sound signals) emitted by the speaker while picking up the environmental noise. In order to prevent the microphone array from picking up the interference signal emitted by the speaker, the microphone array may be located far away from the speaker. However, when the microphone array is located far away from the speaker, the microphone array may not be able to accurately estimate the sound field and/or noise at the target spatial position because it is too far away from the target spatial position. In order to solve the above problems, the microphone array may be located in a target area to minimize the interference signal from the speaker to the microphone array.

In some embodiments, the target area may be an area where a sound pressure level of the speaker is minimal among all areas. The area with the minimal sound pressure level may be an area where the sound radiated by the speaker is minimal. In some embodiments, the speaker may form at least one pair of acoustic dipoles. For example, a set of sound signals with approximately opposite phases and approximately the same amplitude output from a front side of a diaphragm of the speaker and a back side of the diaphragm may be regarded as two-point sound sources. The two-point sound sources may constitute a pair of acoustic dipoles or similar acoustic dipoles. The sound radiated by the two-point sound sources has obvious directivity. Ideally, in a direction of a line connecting the two-point sound sources, the radiated sound of the speaker may be relatively louder, and the radiated sound in other directions may be significantly smaller. The radiated sound of the speaker is minimal in an area of a mid-vertical line (or near the mid-vertical line) connecting the two-point sound sources.

In some embodiments, the speaker (e.g., the speaker 130) in the acoustic device (e.g., the acoustic device 100) may be a bone conduction speaker. When the speaker is the bone conduction speaker and the interference signal is a leakage signal of the bone conduction speaker, the target area may be an area where the sound pressure level of the leakage signal of the bone conduction speaker is minimal. The area with the minimal sound pressure level of the leakage signal may refer to an area where the leakage signal radiated by the bone conduction speaker is minimal. The microphone array may be located in the area where the sound pressure level of the leakage signal of the bone conduction speaker is minimal, which may reduce the interference signal of the bone conduction speaker acquired by the microphone array, and effectively solve the problem that the microphone array is too far away from the target spatial position to accurately estimate the sound field at the target spatial position.

Figure 11:
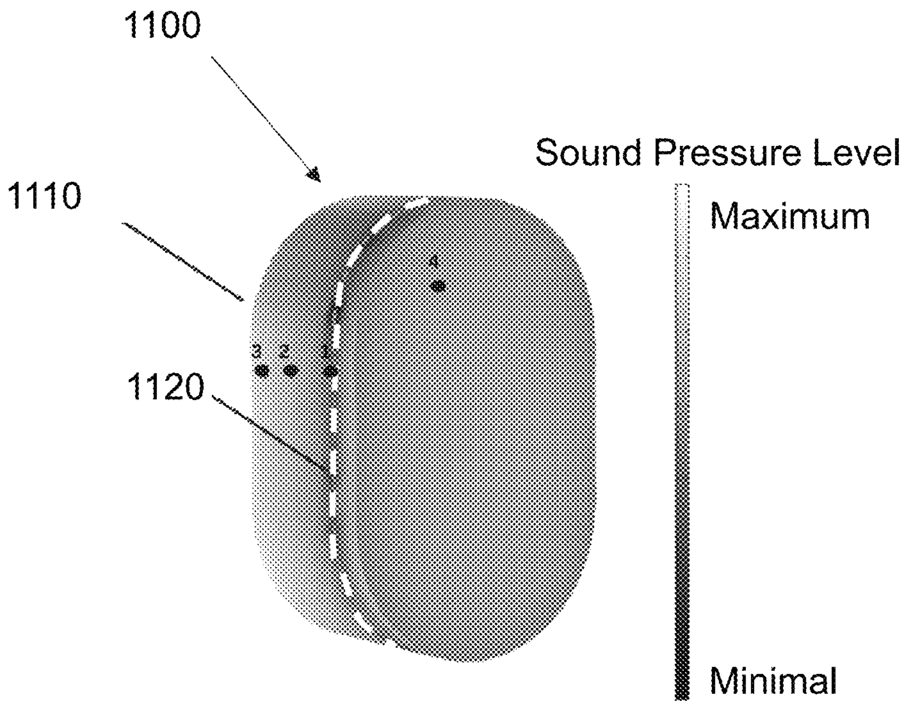
FIG. 11 is a schematic diagram illustrating an exemplary distribution of a leakage signal in a three-dimensional sound field of a bone conduction speaker at 1000 Hz according to some embodiments of the present disclosure.
Figure 12:
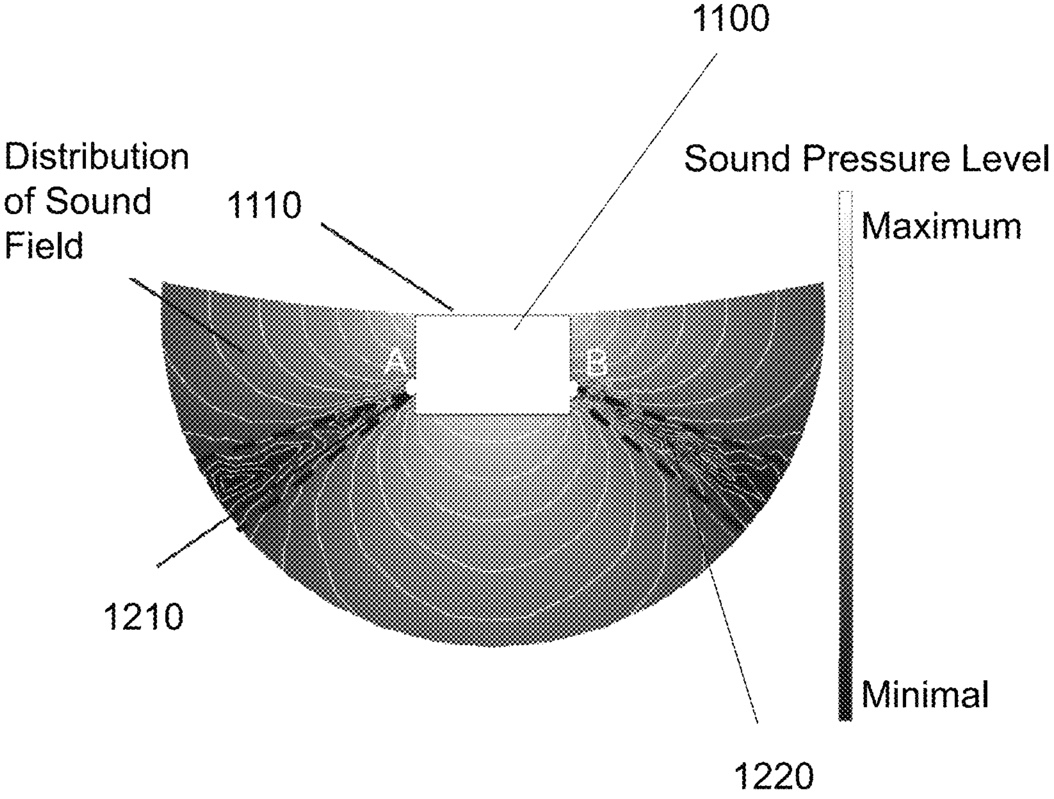
FIG. 12 is a schematic diagram illustrating an exemplary distribution of a leakage signal in a two-dimensional sound field of a bone conduction speaker at 1000 Hz according to some embodiments of the present disclosure.

FIG. 11 is a schematic diagram illustrating an exemplary distribution of a leakage signal in a three-dimensional sound field of a bone conduction speaker at 1000 Hz according to some embodiments of the present disclosure. FIG. 12 is a schematic diagram illustrating an exemplary distribution of a leakage signal in a two-dimensional sound field of a bone conduction speaker at 1000 Hz according to some embodiments of the present disclosure. As shown in FIGS. 11-12, the acoustic device 1100 may include a contact surface 1110. The contact surface 1110 may be configured to contact the user's body (e.g., a face, an ear) when the user wears the acoustic device 1100. The bone conduction speaker may be arranged inside the acoustic device 1100. As shown in FIG. 11, a color on the acoustic device 1100 may indicate the leakage signal of the bone conduction speaker. Different color depths may indicate a size of the leakage signal. The lighter the color, the greater the leakage signal of the bone conduction speaker. The darker the color, the smaller the leakage signal of the bone conduction speaker. As shown in FIG. 11, compared with other areas, an area 1120 where a dashed line is located is darker in color and the leakage signal is smaller. Therefore, the area 1120 where the dashed line is located may be the area where the sound pressure level of the leakage signal of the bone conduction speaker is minimal. Merely by way of example, the microphone array may be located in the area 1120 where the dashed line is located (e.g., a position 1), so that the leakage signal acquired by the microphone array from the bone conduction speaker may be minimal.

In some embodiments, the sound pressure in the area with the minimal sound pressure level of the leakage signal of the bone conduction speaker may be 5-30 dB lower than a maximum sound pressure output by the bone conduction speaker. In some embodiments, the sound pressure in the area with the minimal sound pressure level of the leakage signal of the bone conduction speaker may be 7-28 dB lower than the maximum sound pressure output by the bone conduction speaker. In some embodiments, the sound pressure in the area with the minimal sound pressure level of the leakage signal of the bone conduction speaker may be 9-26 dB lower than the maximum sound pressure output by the bone conduction speaker. In some embodiments, the sound pressure in the area with the minimal sound pressure level of the leakage signal of the bone conduction speaker may be 11-24 dB lower than the maximum sound pressure output by the bone conduction speaker. In some embodiments, the sound pressure in the area with the minimal sound pressure level of the leakage signal of the bone conduction speaker may be 13-22 dB lower than the maximum sound pressure output by the bone conduction speaker. In some embodiments, the sound pressure in the area with the minimal sound pressure level of the leakage signal of the bone conduction speaker may be 15-20 dB lower than the maximum sound pressure output by the bone conduction speaker. In some embodiments, the sound pressure in the area with the minimal sound pressure level of the leakage signal of the bone conduction speaker may be 17-18 dB lower than the maximum sound pressure output by the bone conduction speaker. In some embodiments, the sound pressure in the area with the minimal sound pressure level of the leakage signal of the bone conduction speaker may be 15 dB lower than the maximum sound pressure output by the bone conduction speaker.

The distribution of the sound leakage signal in the two-dimensional sound field shown in FIG. 12 is a two-dimensional cross-sectional view of the distribution of the sound leakage signal in the three-dimensional sound field shown in FIG. 11. As shown in FIG. 12, the color on the cross-section may indicate the leakage signal of the bone conduction speaker. Different color depths may indicate the size of the leakage signal. The lighter the color, the larger the leakage signal of the bone conduction speaker. The darker the color, the smaller the leakage signal of the bone conduction speaker. As shown in FIG. 12, compared with other areas, the areas 1210 and 1220 where the dashed lines are located are darker in color and the leakage signal is smaller. Therefore, the areas 1210 and 1220 where the dashed lines are located may be the areas where the sound pressure level of the leakage signal of the bone conduction speaker is minimal. Merely by way of example, the microphone array may be set in the areas 1210 and 1220 where the dashed lines are located (e.g., a position A and a position B), so that the leakage signal acquired by the microphone array from the bone conduction speaker may be minimal.

In some embodiments, a vibration signal emitted by the bone conduction speaker during the vibration process is relatively larger. Therefore, not only the leakage signal of the bone conduction speaker will interfere with the microphone array, but also the vibration signal of the bone conduction speaker will interfere with the microphone array. The vibration signal of the bone conduction speaker may refer to the vibration of other components (e.g., a housing, the microphone array) of the acoustic device driven by the vibration of a vibration component of the bone conduction speaker. In this case, the interference signal of the bone conduction speaker may include the leakage signal and vibration signal of the bone conduction speaker. In order to prevent the microphone array from picking up the interference signal of the bone conduction speaker, the target area where the microphone array is located may be an area where a total energy of the leakage signal and the vibration signal of the bone conduction speaker transmitted to the microphone array is minimal. The leakage signal and vibration signal of the bone conduction speaker are relatively independent signals. The area with the minimal sound pressure level of the leakage signal of the bone conduction speaker may not represent that the area where the total energy of the leakage signal and vibration signal of the bone conduction speaker is minimal. Therefore, the determination of the target area may require analysis of a total signal of the vibration signal and the leakage signal of the bone conduction speaker.

Figure 13:
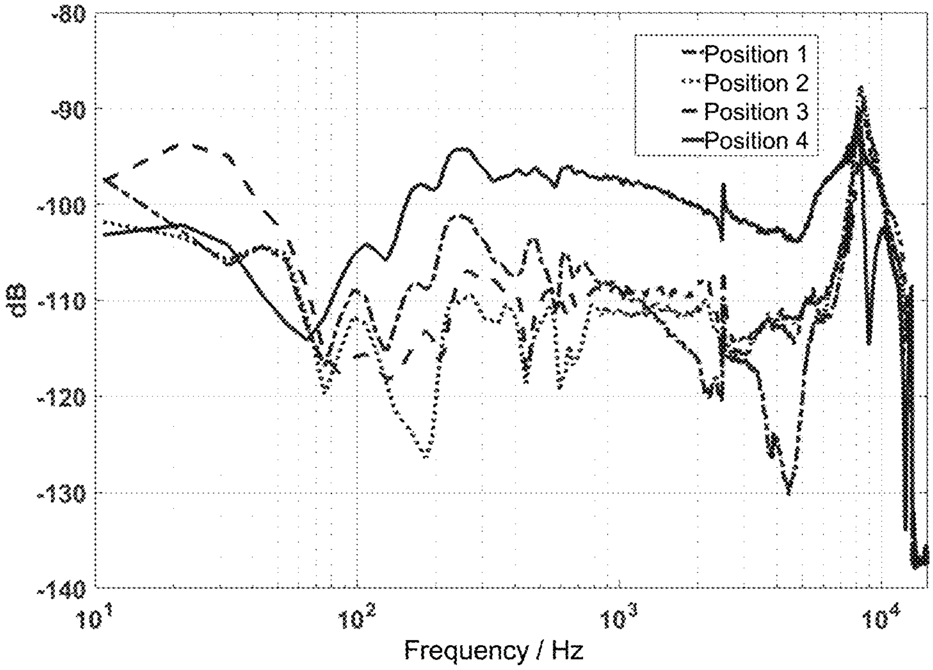
FIG. 13 is a schematic diagram illustrating an exemplary frequency response of a total signal of a vibration signal and a leakage signal of a bone conduction speaker according to some embodiments of the present disclosure.

FIG. 13 is a schematic diagram illustrating an exemplary frequency response of a total signal of a vibration signal and a leakage signal of a bone conduction speaker according to some embodiments of the present disclosure. FIG. 13 shows frequency response curves of the total signal of the vibration signal and the leakage signal of the bone conduction speaker at a position 1, a position 2, a position 3, and a position 4 on the acoustic device 1100 shown in FIG. 11. In some embodiments, the total signal may refer to a superimposed signal of the vibration signal and the leakage signal of the bone conduction speaker. As shown in FIG. 13, an abscissa may represent the frequency, and the ordinate may represent the sound pressure of the total signal of the vibration signal and the leakage signal of the bone conduction speaker. As described in connection with FIG. 11, when only the leakage signal of the bone conduction speaker is considered, the position 1 is located in the area with the minimal sound pressure level of the speaker 130 and may be used as the target area for setting the microphone array (e.g., microphone array 110, microphone array 820, microphone array 1020). When considering both the vibration signal and the leakage signal of the bone conduction speaker, the target area (i.e., the area where the sound pressure of the total signal of the vibration signal and the leakage signal of the bone conduction speaker is minimal) for setting the microphone array may not be the position 1. Referring to FIG. 13, compared with other positions, the sound pressure of the total signal of the vibration signal and the leakage signal of the bone conduction speaker corresponding to the position 2 may be minimal. Therefore, the position 2 may be used as the target area for setting the microphone array.

In some embodiments, a position of the target area may be related to a facing direction of a diaphragm of at least one microphone in the microphone array. The facing direction of the diaphragm of the at least one microphone may affect a magnitude of the vibration signal of the bone conduction speaker received by the at least one microphone. For example, when the diaphragm of the at least one microphone is perpendicular to the vibration component of the bone conduction speaker, the vibration signal of the bone conduction speaker acquired by the at least one microphone may be small. As another example, when the diaphragm of the at least one microphone is parallel to the vibration component of the bone conduction speaker, the vibration signal of the bone conduction speaker acquired by the at least one microphone may be relatively large. In some embodiments, the facing direction of the diaphragm of the at least one microphone may be set to reduce the vibration signal of the bone conduction speaker acquired by the at least one microphone. For example, when the diaphragms of the microphones in the microphone array are perpendicular to the vibration component of the bone conduction speaker, the vibration signal of the bone conduction speaker may be ignored in the process of determining the target area of the microphone array, and only the leakage signal of the bone conduction speaker may be considered. The target area for setting the microphone array may be determined according to the descriptions in FIG. 11 and FIG. 12. As another example, when the diaphragm of the microphones in the microphone array are parallel to the vibration component of the bone conduction speaker, the vibration signal and the leakage signal of the bone conduction speaker may be considered in the process of determining the target area of the microphone array, that is, the target area for setting the microphone array may be determined according to the descriptions in FIG. 13.

In some embodiments, a phase of the vibration signal of the bone conduction speaker acquired by the at least one microphone in the microphone array may be adjusted by adjusting the facing direction of the diaphragm of the at least one microphone, so that the vibration signal of the bone conduction speaker acquired by the at least one microphone and the leakage signal of the bone conduction speaker acquired by the at least one microphone may have approximately opposite phases and approximately equal magnitude. Therefore, the vibration signal of the bone conduction speaker acquired by the at least one microphone and the leakage signal of the bone conduction speaker acquired by the at least one microphone may at least partially offset each other, which may reduce the interference signal acquired by the microphone array from the bone conduction speaker. In some embodiments, the vibration signal of the bone conduction speaker acquired by the at least one microphone may reduce the leakage signal of the bone conduction speaker acquired by the at least one microphone by 5-6 dB.

In some embodiments, the speaker (e.g., the speaker 130) in the acoustic device (e.g., the acoustic device 100) may be an air conduction speaker. When the speaker is the air conduction speaker and the interference signal is a sound signal (i.e., a radiated sound field) from the air conduction speaker, the target area may be an area where the sound pressure level of the radiated sound field of the air conduction speaker is minimal. The microphone array may be arranged in the area where the sound pressure level of the radiated sound field of the air conduction speaker is minimal, which may reduce the interference signal acquired by the microphone array from the air conduction speaker, thereby effectively solving the problem that the microphone array is too far away from the target spatial position to accurately estimate the sound field at the target spatial position.

Figure 14A:
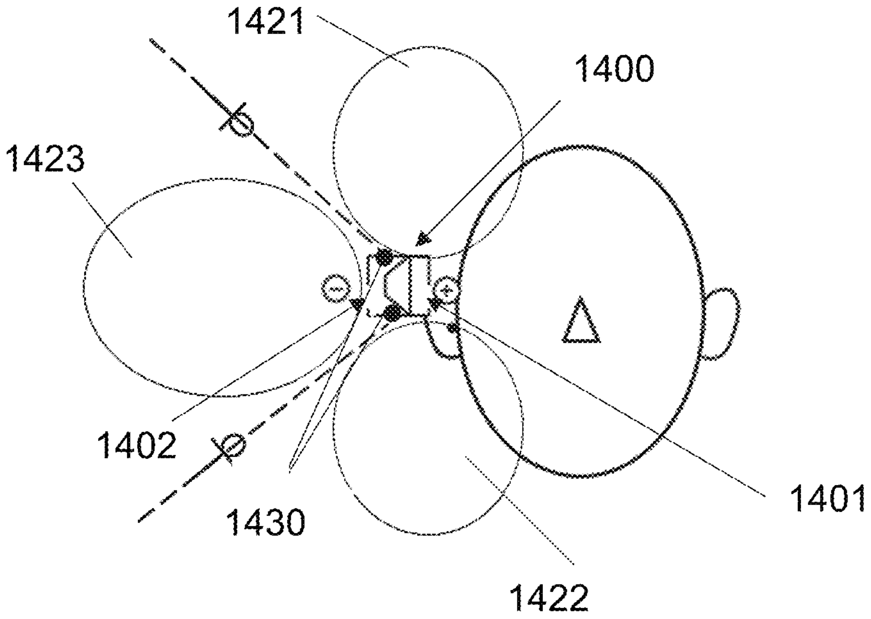
FIGS. 14A-14B are schematic diagrams illustrating exemplary distributions of sound fields of air conduction speakers according to some embodiments of the present disclosure.
Figure 14B:
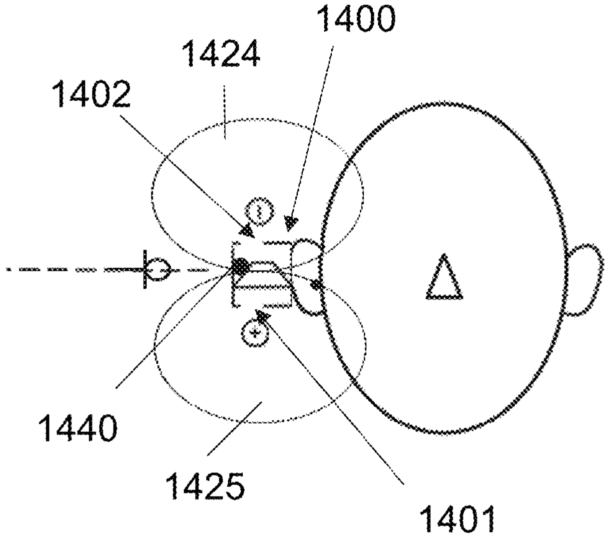

FIGS. 14A and 14B are schematic diagrams illustrating exemplary distributions of sound fields of air conduction speakers according to some embodiments of the present disclosure. As shown in FIGS. 14A-14B, the air conduction speaker may be arranged in an open acoustic device 1400 and radiate sound from two sound guiding holes (e.g., 1401 and 1402 in FIGS. 14A-14B) of the open acoustic device 1400. The radiated sound may form a pair of acoustic dipoles (represented by the "+" and "−" shown in FIGS. 14A-14B).

As shown in FIG. 14A, the open acoustic device 1400 may be arranged to make a line connecting the pair of acoustic dipoles is approximately perpendicular to the user's face area. In this case, the sound radiated by the pair of acoustic dipoles may form three strong sound field areas 1421, 1422, and 1423. The area (also be referred to as a low sound pressure area) with the minimal sound pressure level of the radiated sound field of the air conduction speaker may be formed between the sound field area 1421 and the sound field area 1423 and between the sound field area 1422 and the sound field area 1423, for example, the dashed line and its vicinity area in FIG. 14A. The area with the minimal sound pressure level may refer to an area where a sound intensity output by the open acoustic device 1400 is relatively small. In some embodiments, the microphone 1430 in the microphone array may be arranged in the area with minimal sound pressure level. For example, the microphone 1430 in the microphone array may be arranged in the area where the dashed line in FIG. 14 intersects the housing of the open acoustic device 1400, so that the microphone 1430 may acquire as little sound signal from the air conduction speaker as possible while picking up external environmental noise, thereby reducing the interference of the sound signal emitted by the air conduction speaker on the active noise reduction function of the open acoustic device 1400.

As shown in FIG. 14B, the open acoustic device 1400 may be arranged to make a line connecting the pair of acoustic dipoles is approximately parallel to the user's face area. In this case, the sound radiated by the pair of acoustic dipoles may form two strong sound field areas 1424 and 1425. The area with the minimal sound pressure level of the radiated sound field of the air conduction speaker may be formed between the sound field area 1424 and the sound field area 1425, for example, the dashed line and its vicinity area in FIG. 14B. In some embodiments, the microphone 1440 in the microphone array may be arranged in the area with minimal sound pressure level. For example, the microphone 1440 in the microphone array may be arranged in the area where the dashed line in FIG. 14 intersects the housing of the open acoustic device 1400, so that the microphone 1440 can acquire as little sound signal from the air conduction speaker as possible while picking up external environmental noise, thereby reducing the interference of the sound signal emitted by the air conduction speaker on the active noise reduction function of the open acoustic device 1400.

Figure 15:
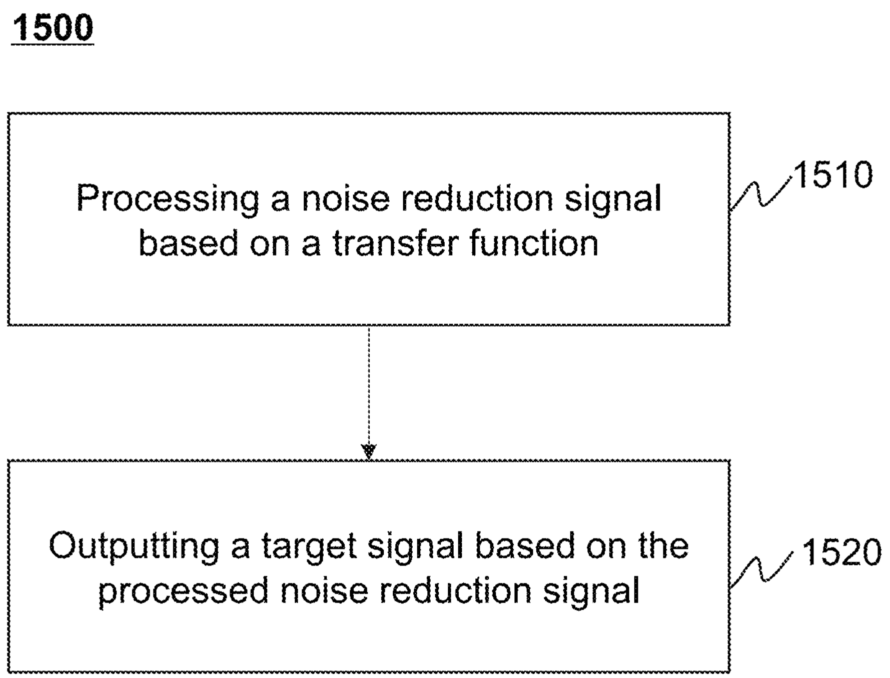
FIG. 15 is a flowchart illustrating an exemplary process for outputting a target signal based on a transfer function according to some embodiments of the present disclosure.

FIG. 15 is a flowchart illustrating an exemplary process for outputting a target signal based on a transfer function according to some embodiments of the present disclosure. As shown in FIG. 15, process 1500 may include the following operations.

In 1510, a noise reduction signal may be processed based on a transfer function. In some embodiments, operation 1510 may be performed by the processor 120 (e.g., the amplitude-phase compensation unit 230). More descriptions regarding the noise reduction signal may be found elsewhere in the present disclosure. See, e.g., FIG. 3 and the relevant descriptions thereof. In addition, as described in connection with FIG. 3, the speaker (e.g., the speaker 130) may output a target signal based on the noise reduction signal generated by the processor 120.

In some embodiments, the target signal output by the speaker may be transmitted to a specific position (also referred to as a noise offset position) in the user's ear through a first sound path, and the environmental noise may be transmitted to the specific position in the user's ear through a second sound path. The target signal and the environmental noise may offset each other at the specific location, so that the user may not perceive the environmental noise or may perceive a weaker environmental noise. In some embodiments, when the speaker is an air conduction speaker, the specific position where the target signal and the environmental noise offset each other may be the user's ear canal or its vicinity, for example, the target spatial position. The first sound path may be a path through which the target signal is transmitted from the air conduction speaker to the target spatial position through the air. The second sound path may be a path through which the environmental noise is transmitted from the noise source to the target spatial position. In some embodiments, when the speaker is a bone conduction speaker, the specific position where the target signal and the environmental noise offset each other may be the basement membrane of the user. The first sound path may be a path through which the target signal is transmitted from the bone conduction speaker through the user's bones or tissues to the user's basement membrane. The second sound path may be a path through which the environmental noise is transmitted from the noise source through the user's ear canal and tympanic membrane to the user's basement membrane.

In some embodiments, the speaker (e.g., the speaker 130) may be arranged near the user's ear canal and not block the user's ear canal, so that there is a certain distance between the speaker and the noise offset position (e.g., the target spatial position, the basement membrane). Therefore, when the target signal output by the speaker is transmitted to the noise offset position, the phase information and amplitude information of the target signal may change. As a result, the target signal output by the speaker may not achieve the effect of reducing the environmental noise, and even enhancing the environmental noise, thereby causing the active noise reduction function of the acoustic device (e.g., the acoustic device 100) to be unable to be realized.

Based on the foregoing, the processor 120 may obtain a transfer function of the target signal transmitted from the speaker to the noise offset position. The transfer function may include a first transfer function and a second transfer function. The first transfer function may indicate a change, with the sound path (i.e., the first sound path), in a parameter (e.g., a change of the amplitude, a change of the phase) of the target signal transmitted from the speaker to the noise offset position. In some embodiments, when the speaker is a bone conduction speaker, the target signal emitted by the bone conduction speaker is a bone conduction signal, and the position where the target signal emitted by the bone conduction speaker and the environmental noise offset each other is the basement membrane of the user. In this case, the first transfer function may indicate the change in the parameter (e.g., the phase, the amplitude) of the target signal transmitted from the bone conduction speaker to the basement membrane of the user. In some embodiments, when the speaker is a bone conduction speaker, the first transfer function may be obtained through experiments. For example, a bone conduction speaker emits a target signal, and at the same time, an air conduction sound signal with the same frequency as the target signal may be played near the user's ear canal. The offset effect of the target signal and the air conduction sound signal may be observed. When the target signal and the air conduction sound signal offset each other, the first transfer function of the bone conduction speaker may be obtained based on the air conduction sound signal and the target signal output by the bone conduction speaker. In some embodiments, when the speaker is an air conduction speaker, the target signal emitted by the air conduction speaker is an air conduction sound signal. In this case, the first transfer function may be obtained through simulating and calculating an acoustic diffusion field of the target signal. For example, the acoustic diffusion field may be used to simulate a sound field at the target signal emitted by the air conduction speaker, and the first transfer function of the air conduction speaker may be calculated based on the sound field. The second transfer function may indicate a change in a parameter (e.g., a change of the amplitude, a change of the phase) of the environmental noise transmitted from the target spatial position to the position where the target signal and the environmental noise offset each other. Merely by way of example, when the speaker is a bone conduction speaker, the second transfer function may indicate the change in the parameter of the environmental noise transmitted from the target spatial position to the user's basement membrane. In some embodiments, the second transfer function may be obtained through simulating and calculating an acoustic diffusion field of the environmental noise. For example, the acoustic diffusion field may be used to simulate a sound field of the environmental noise, and the second transfer function may be calculated based on the sound field.

In some embodiments, during the transmission of the target signal, there may not only be a phase change, but also an energy loss of the signal. Therefore, the transfer function may include a phase transfer function and an amplitude transfer function. In some embodiments, both the phase transfer function and the amplitude transfer function may be obtained by the above-mentioned manners.

Further, the processor 120 may process the noise reduction signal based on the obtained transfer function. In some embodiments, the processor 120 may adjust the amplitude and phase of the noise reduction signal based on the obtained transfer function. In some embodiments, the processor 120 may adjust the phase of the noise reduction signal based on the obtained phase transfer function and the amplitude of the noise reduction signal based on the amplitude transfer function.

In 1520, a target signal may be output based on the processed noise reduction signal. In some embodiments, operation 1520 may be performed by the speaker 130.

In some embodiments, the speaker 130 may output the target signal based on the noise reduction signal processed in operation 1510, so that when the target signal output by the speaker 130 based on the processed noise reduction signal is transmitted to the position where the environmental noise and the target signal offset each other, the amplitudes and the phases of the target signal and the environmental noise may satisfy a certain condition. In some embodiments, a phase difference between the phase of the target signal and the phase of the environmental noise may be less than or equal to a certain phase threshold. The phase threshold may be in a range of 90-180 degrees. The phase threshold may be adjusted within the range according to the needs of the user. For example, when the user does not want to be disturbed by the sound of the surrounding environment, the phase threshold may be a larger value, such as 180 degrees, that is, the phase of the target signal is opposite to the phase of the environmental noise. As another example, when the user wants to be sensitive to the surrounding environment, the phase threshold may be a small value, such as 90 degrees. It should be noted that the more environmental sound the user wants to receive, the closer the phase threshold may be to 90 degrees; the less environmental sound the user wants to receive, the closer the phase threshold may be to 180 degrees. In some embodiments, when the phase of the target signal and the phase of the environmental noise are constant (e.g., the phase is opposite), an amplitude difference between the amplitude of the environmental noise and the amplitude of the target signal may be less than or equal to a certain amplitude threshold. For example, when the user does not want to be disturbed by the sound of the surrounding environment, the amplitude threshold may be a small value, such as 0 dB, that is, the amplitude of the target signal is equal to the amplitude of the environmental noise. As another example, when the user wants to be sensitive to the surrounding environment, the amplitude threshold may be a larger value, for example, approximately equal to the amplitude of the environmental noise. It should be noted that the more environmental sound the user wants to receive, the closer the amplitude threshold may be to the amplitude of the environmental noise, and the less environmental sound the user wants to receive, the closer the amplitude threshold may be to 0 dB. As a result, the purpose of reducing environmental noise and the active noise reduction function of the acoustic device (e.g., the acoustic device 100) may be realized, and the user's hearing experience may be improved.

It should be noted that the above description about process 1500 is merely provided for the purposes of illustration, and not intended to limit the scope of the present disclosure. Apparently, for persons having ordinary skills in the art, multiple variations and modifications to process 1500 may be conducted under the teachings of the present disclosure. For example, the process 1500 may also include an operation of obtaining the transfer function. As another example, operation 1510 and operation 1520 may be combined into one operation. However, those variations and modifications do not depart from the scope of the present disclosure.

Figure 16:
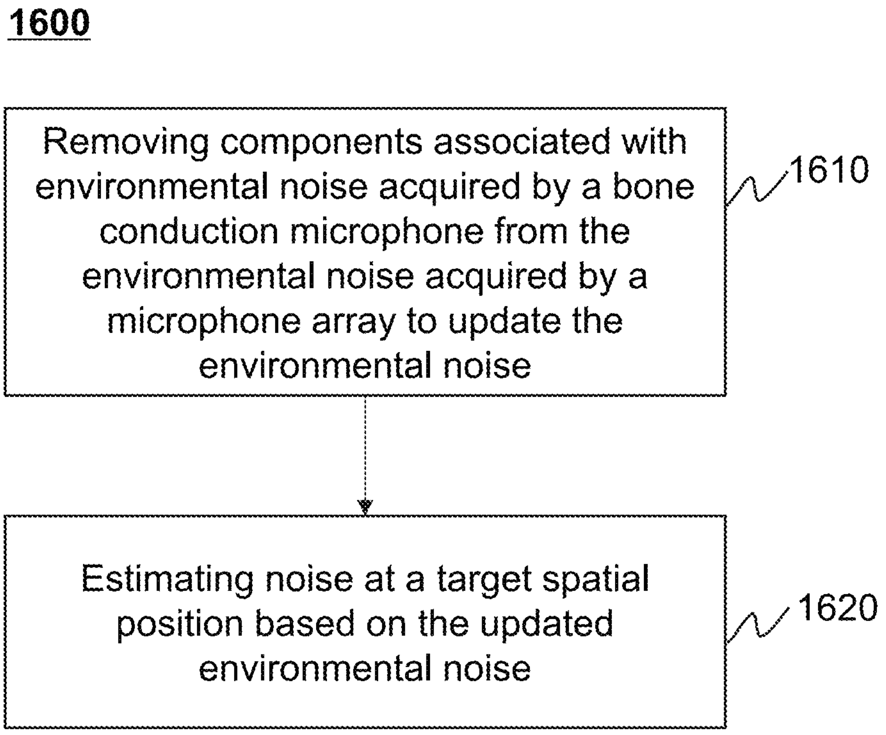
FIG. 16 is a flowchart illustrating an exemplary process for estimating noise at a target spatial position according to some embodiments of the present disclosure.

FIG. 16 is a flowchart illustrating an exemplary process for noise estimation of a target spatial position according to some embodiments of the present disclosure. As shown in FIG. 16, process 1600 may include the following operations.

In 1610, components associated with environmental noise acquired by a bone conduction microphone may be removed from the environmental noise acquired by a microphone array to update the environmental noise.

In some embodiments, operation 1610 may be performed by the processor 120. In some embodiments, when the microphone array (e.g., the microphone array 110) picks up the environmental noise, the user's speaking voice may also be acquired by the microphone array, that is, the user's own speaking voice may also be regarded as a part of the environmental noise. In this case, a target signal output by the speaker (e.g., the speaker 130) may offset the user's own speaking voice. In some embodiments, in certain scenarios, for example, when the user makes a voice call or sends a voice message, the user's speaking voice may need to be retained. In some embodiments, an acoustic device (such as the acoustic device 100) may include a bone conduction microphone. When the user wears the acoustic device to make a voice call or record voice information, the bone conduction microphone may acquire the user's speaking voice by picking up vibration signals generated by the facial bones or muscles when the user speaks. The user's speaking voice acquired by the bone conduction microphone may be transmitted to the processor 120. The processor 120 may obtain parameter information of the sound signal acquired by the bone conduction microphone and remove the components associated with the sound signal acquired by the bone conduction microphone from the environmental noise acquired by the microphone array (e.g., the microphone array 110). The processor 120 may update the environmental noise according to the parameter information of the remaining environmental noise. The updated environmental noise may no longer contain the user's own speaking voice, that is, the user may hear his/her own speaking voice when the user is in a voice call.

In 1620, noise at a target spatial position may be estimated based on the updated environmental noise. In some embodiments, operation 1620 may be performed by the processor 120. Operation 1620 may be performed in a similar manner as operation 320, and relevant descriptions are not repeated here.

It should be noted that the above description about process 1600 is merely provided for the purposes of illustration, and not intended to limit the scope of the present disclosure. Apparently, for persons having ordinary skills in the art, multiple variations and modifications to process 1600 may be conducted under the teachings of the present disclosure. For example, the process 1600 may also include operations of preprocessing the components associated with the sound signal acquired by the bone conduction microphone and transmitting the sound signal acquired by the bone conduction microphone as an audio signal to a terminal device. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic device, comprising:

a microphone array configured to acquire an environmental noise;

a processor configured to:

obtain a sound field estimation by estimating a sound field at a target spatial position using the microphone array, wherein the target spatial position is closer to an ear canal of a user than each microphone in the microphone array, and generate a noise reduction signal based on the environmental noise and the sound field estimation of the target spatial position; and at least one speaker configured to output a target signal based on the noise reduction signal, the target signal being used to reduce the environmental noise.

2. The acoustic device of claim 1, wherein to generate the noise reduction signal based on the environmental noise and the sound field estimation of the target spatial position, the processor is further configured to:

estimate a noise at the target spatial position based on the environmental noise; and generate the noise reduction signal based on the noise at the target spatial position and the sound field estimation of the target spatial position.

3. The acoustic device of claim 2, wherein the acoustic device further comprises one or more sensors configured to acquire motion information of the acoustic device, and the processor is further configured to:

update the noise at the target spatial position and the sound field estimation of the target spatial position based on the motion information; and generate the noise reduction signal based on the updated noise at the target spatial position and the updated sound field estimation of the target spatial position.

4. The acoustic device of claim 2, wherein to estimate the noise at the target spatial position based on the environmental noise, the processor is further configured to:

determine one or more spatial noise sources related to the environmental noise; and estimate the noise at the target spatial position based on the spatial noise sources.

5. The acoustic device of claim 2, wherein to estimate the sound field at the target spatial position using the microphone array, the processor is further configured to:

construct a virtual microphone based on the microphone array, the virtual microphone including a mathematical model or a machine learning model that indicates audio data collected by a microphone if the target spatial position includes a microphone; and estimate the sound field at the target spatial position based on the virtual microphone.

6. The acoustic device of claim 5, wherein to generate the noise reduction signal based on the environmental noise and the sound field estimation of the target spatial position, the processor is further configured to:

estimate a noise at the target spatial position based on the virtual microphone; and generate the noise reduction signal based on the noise at the target spatial position and the sound field estimation of the target spatial position.

7. The acoustic device of claim 5, wherein the microphone array is arranged in a target area to minimize an interference signal from the at least one speaker to the microphone array.

8. The acoustic device of claim 7, wherein the at least one speaker is a bone conduction speaker, the interference signal includes a leakage signal and a vibration signal of the bone conduction speaker, and a total energy of the leakage signal and the vibration signal transmitted from the target area to the bone conduction speaker of the microphone array is minimal.

9. The acoustic device of claim 8, wherein:

a position of the target area is related to a facing direction of a diaphragm of at least one microphone in the microphone array, the facing direction of the diaphragm of the at least one microphone reduces a magnitude of the vibration signal of the bone conduction speaker received by the at least one microphone, the facing direction of the diaphragm of the at least one microphone makes the vibration signal of the bone conduction speaker received by the at least one microphone and the leakage signal of the bone conduction speaker received by the at least one microphone at least partially offset each other, and the vibration signal of the bone conduction speaker received by the at least one microphone reduces the leakage signal of the bone conduction speaker received by the at least one microphone by 5-6 dB.

10. The acoustic device of claim 7, wherein the at least one speaker is an air conduction speaker, and a sound pressure level of a radiated sound field of the air conduction speaker at the target area is minimal.

11. The acoustic device of claim 1, wherein the processor is further configured to process the noise reduction signal based on a transfer function, the transfer function including a first transfer function and a second transfer function, the first transfer function indicating a change in a parameter of the target signal from the at least one speaker to a position where the target signal and the environmental noise offset, the second transfer function indicating a change in a parameter of the environmental noise from the target spatial position to the position where the target signal and the environmental noise offset; and the at least one speaker is further configured to output the target signal based on the processed noise reduction signal.

12. The acoustic device of claim 1, wherein to generate the noise reduction signal based on the environmental noise and the sound field estimation of the target spatial position, the processor is further configured to:

divide the environmental noise into a plurality of frequency bands, the plurality of frequency bands corresponding to different frequency ranges; and for at least one of the plurality of frequency bands, generate the noise reduction signal corresponding to each of the at least one frequency band.

13. The acoustic device of claim 1, wherein the processor is further configured to generate the noise reduction signal by performing amplitude and phase adjustments on the noise at the target spatial position based on the sound field estimation of the target spatial position.

14. The acoustic device of claim 1, wherein the acoustic device further comprises a fixing structure configured to fix the acoustic device to a position near an ear of the user without blocking the ear canal of the user.

15. The acoustic device of claim 1, wherein the acoustic device further comprises a housing structure configured to carry or accommodate the microphone array, the processor, and the at least one speaker.

16. A method, comprising:

acquiring an environmental noise using a microphone array;

obtaining a sound field estimation by estimating a sound field at a target spatial position using the microphone array using a processor, wherein the target spatial position is closer to an ear canal of a user than each microphone in the microphone array;

generating a noise reduction signal based on the environmental noise and the sound field estimation of the target spatial position using the processor; and outputting a target signal based on the noise reduction signal using at least one speaker, the target signal being used to reduce the environmental noise.

17. The method of claim 16, wherein the generating a noise reduction signal based on the environmental noise and the sound field estimation of the target spatial position comprises:

estimating a noise at the target spatial position based on the environmental noise; and generating the noise reduction signal based on the noise at the target spatial position and the sound field estimation of the target spatial position.

18. The method of claim 17, further comprising:

acquiring motion information of the acoustic device;

updating the noise at the target spatial position and the sound field estimation of the target spatial position based on the motion information; and generating the noise reduction signal based on the updated noise at the target spatial position and the updated sound field estimation of the target spatial position.

19. The method of claim 16, wherein the estimating a sound field at a target spatial position using the microphone array comprises:

constructing a virtual microphone based on the microphone array, the virtual microphone including a mathematical model or a machine learning model that indicates audio data collected by a microphone if the target spatial position includes a microphone; and estimating the sound field at the target spatial position based on the virtual microphone.

20. A system, comprising:

at least one storage device including a set of instructions; and at least one processor in communication with the at least one storage device, wherein when executing the set of instructions, the at least one processor causes the system to perform operations including:

acquiring an environmental noise using a microphone array;

obtain a sound field estimation by estimating a sound field at a target spatial position using the microphone array, wherein the target spatial position is closer to an ear canal of a user than each microphone in the microphone array;

generating a noise reduction signal based on the environmental noise and the sound field estimation of the target spatial position; and outputting a target signal based on the noise reduction signal using at least one speaker, the target signal being used to reduce the environmental noise.

* * * * *